United States Patent
Okura et al.

(10) Patent No.: US 10,072,476 B2
(45) Date of Patent: Sep. 11, 2018

(54) POLY-L-LACTIC ACID SOLID-STATE EXTRUSION MOLDED ARTICLE, METHOD FOR PRODUCING THE SAME, AND USE APPLICATIONS OF THE SAME

(71) Applicant: Kureha Corporation, Tokyo (JP)

(72) Inventors: Masayuki Okura, Tokyo (JP); Takeo Takahashi, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 434 days.

(21) Appl. No.: 14/759,958

(22) PCT Filed: Jan. 9, 2014

(86) PCT No.: PCT/JP2014/050184
§ 371 (c)(1),
(2) Date: Jul. 9, 2015

(87) PCT Pub. No.: WO2014/109347
PCT Pub. Date: Jul. 17, 2014

(65) Prior Publication Data
US 2015/0354311 A1     Dec. 10, 2015

(30) Foreign Application Priority Data

Jan. 11, 2013 (JP) ................... 2013-003108
Aug. 9, 2013 (JP) ................... 2013-166792

(51) Int. Cl.
*E21B 33/12* (2006.01)
*B29C 71/02* (2006.01)
(Continued)

(52) U.S. Cl.
CPC .......... *E21B 33/12* (2013.01); *B29C 47/0004* (2013.01); *B29C 47/92* (2013.01);
(Continued)

(58) Field of Classification Search
CPC .......... E21B 33/12; E21B 7/00; E21B 33/138; B29C 47/92; B29C 71/02; B29C 47/0004;
(Continued)

(56) References Cited

U.S. PATENT DOCUMENTS 9,127,527 B2 * 9/2015 Frazier ................. E21B 33/129
2004/0231845 A1 11/2004 Cooke
(Continued)

FOREIGN PATENT DOCUMENTS

| CN | 102916227 A | 2/2013 |
| JP | 2005226031 A | 8/2005 |

(Continued)

OTHER PUBLICATIONS

Notification of the First Office Action dated Apr. 5, 2016, in Chinese Patent Application No. 201480003987.0, with English translation.
(Continued)

*Primary Examiner* — Michael R Wills, III
(74) *Attorney, Agent, or Firm* — Birch, Stewart, Kolasch & Birch, LLP

(57) ABSTRACT

A poly-L-lactic acid (PLLA) solid-state extrusion molded article having a weight average molecular weight of from 100,000 to 380,000 and a melt viscosity of from 20 to 2,000 Pa·s (at a temperature of 240° C. and a shear rate of 120 sec$^{-1}$) and having an L-form content of from 80 to 100%, the article having a thickness or diameter of from 10 to 500 mm and a tensile strength of from 5 to 100 MPa at a temperature of 66° C. (the article may contain a filler and have a tensile strength of from 5 to 200 MPa); a downhole tool member or a ball sealer for well drilling and completion formed by machining the solid-state extrusion molded article; an isolation plug provided with the downhole tool member; and a production method for a PLLA solid-state extrusion molded article comprising steps of supplying a resin material con-
(Continued)

taining a PLLA to an extruder, solid-state extrusion molding the material, pressurizing the solid-state extrusion molded product, drawing the pressurized product while applying a back pressure in the direction of a forming die to suppress the expansion of the solid-state extrusion molded product; and a well drilling and completion method.

18 Claims, 1 Drawing Sheet

(51) Int. Cl.
| | |
|---|---|
| B29C 47/00 | (2006.01) |
| E21B 7/00 | (2006.01) |
| C08J 5/04 | (2006.01) |
| E21B 33/138 | (2006.01) |
| B29C 47/92 | (2006.01) |
| B29L 31/26 | (2006.01) |
| B29K 67/00 | (2006.01) |

(52) U.S. Cl.
CPC ............... *B29C 71/02* (2013.01); *C08J 5/04* (2013.01); *E21B 7/00* (2013.01); *E21B 33/138* (2013.01); *B29C 47/0009* (2013.01); *B29C 47/0057* (2013.01); *B29C 2071/022* (2013.01); *B29C 2947/92695* (2013.01); *B29C 2947/92704* (2013.01); *B29K 2067/046* (2013.01); *B29L 2031/26* (2013.01); *C08J 2367/04* (2013.01)

(58) Field of Classification Search
CPC ........... B29C 2947/92695; B29C 2947/92704; B29C 47/0057; B29C 2071/022; B29C 47/0009; C08J 5/04; C08J 2367/04; B29K 2067/046; B29L 2031/26
See application file for complete search history.

(56) References Cited

U.S. PATENT DOCUMENTS

| | | | |
|---|---|---|---|
| 2005/0205265 A1 | 9/2005 | Todd et al. | |
| 2008/0038517 A1 | 2/2008 | Nishihata et al. | |
| 2011/0059669 A1* | 3/2011 | He | B32B 5/16 |
| | | | 442/415 |
| 2011/0088891 A1* | 4/2011 | Stout | E21B 33/1204 |
| | | | 166/120 |
| 2011/0240295 A1 | 10/2011 | Porter et al. | |
| 2011/0277989 A1 | 11/2011 | Frazier | |
| 2012/0214715 A1* | 8/2012 | Luo | C09K 8/50 |
| | | | 507/260 |
| 2012/0285692 A1* | 11/2012 | Potapenko | E21B 21/003 |
| | | | 166/308.1 |
| 2014/0037931 A1* | 2/2014 | Yoo | C08J 5/18 |
| | | | 428/220 |

FOREIGN PATENT DOCUMENTS

| | | |
|---|---|---|
| JP | 2006117768 A | 5/2006 |
| JP | 2009120688 A | 6/2009 |
| JP | 2010150395 A | 7/2010 |
| WO | WO 2010/019535 A3 | 2/2010 |
| WO | WO 2010/148222 A2 | 12/2010 |
| WO | WO2012121294 A1 | 9/2012 |
| WO | WO2012121296 A1 | 9/2012 |
| WO | WO2012144511 A1 | 10/2012 |

OTHER PUBLICATIONS

Office Action dated Aug. 11, 2016, in Canadian Patent Application No. 2,897,290.
Notification of Reasons for Rejection dated Jun. 6, 2017, in Japanese Patent Application No. 2014-556428, with English translation.
International Preliminary Report on Patentability and English translation of the Written Opinion of the International Searching Authority (PCT/IB/338, PCT/IB/373 and PCT/ISA/237) dated Jul. 23, 2015 for Application No. PCT/JP2014/050184.
Notification of Third Office Action dated May 24, 2017, in Chinese Patent Application No. 201480003987.0, with English translation.
Ferguson et al., "Enhancement of the mechanical properties of polylactides by solid-state extrusion. II. Poly(L-lactide), poly (L/D-lactide, and poly (L/DL-lactide)," Journal of Biomedical Materials Research (1996), vol. 30, pp. 543-551.
Lim et al., "Improvement of Flexural Strengths of Poly(L-lactic acid) by Solid-State Extrusion," Macromol. Chem. Phys (2001), vol. 202, No. 11, pp. 2447-2453.
Second Office Action dated Nov. 28, 2016, in Chinese Patent Application No. 2014800039877.0, with English translation.
International Search Report of PCT/JP2014/050184 dated Feb. 25, 2014.
"Enhancement of the mechanical properties of polylactides by solid state extrusion", Biomaterials 1996, vol. 17, No. 5 (1996), pp. 529-535.

* cited by examiner

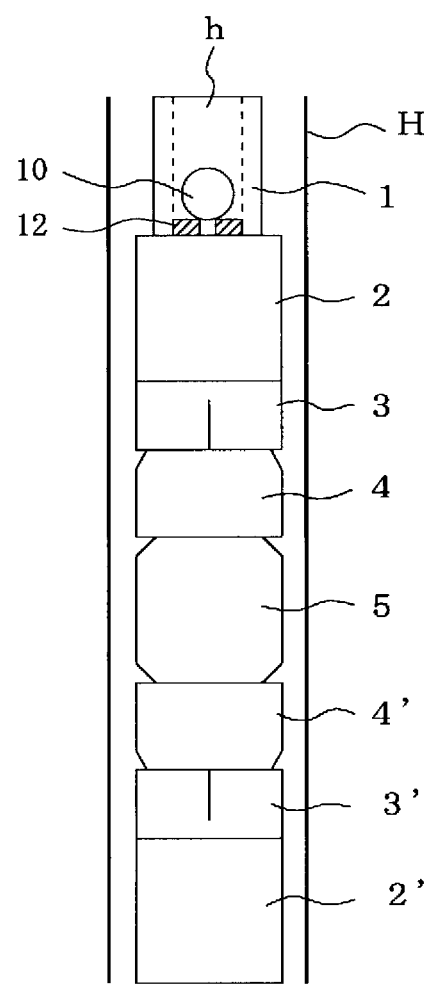

US 10,072,476 B2

POLY-L-LACTIC ACID SOLID-STATE EXTRUSION MOLDED ARTICLE, METHOD FOR PRODUCING THE SAME, AND USE APPLICATIONS OF THE SAME

TECHNICAL FIELD

The present invention relates to a poly-L-lactic acid solid-state extrusion molded article, a method for producing the same, and use applications of the same. More particularly, the present invention relates to a thick or large-diameter poly-L-lactic acid solid-state extrusion molded article that can be molded into a secondary molded article of a desired shape by machining such as cutting, drilling, or shearing, a method for producing the same, a ball sealer for well drilling and completion or a downhole tool member for well drilling and completion formed from the poly-L-lactic acid solid-state extrusion molded article, and a well drilling and completion method.

BACKGROUND ART

Resin molded articles having a three-dimensional shape or complex shape are molded typically by injection molding. Injection molding can mass-produce molded articles having a desired shape. However, in order to manufacture molded articles that are required to have a high dimensional precision by injection molding, an expensive die having a high dimensional precision is required. Furthermore, since injection-molded articles are readily deformed by shrinkage and/or residual stress after the injection molding, the shape of the die needs to be adjusted precisely depending on the shape of the molded article and properties of the resin material. Since fraction defective is high in injection molding, product cost thereby is often high. Furthermore, injection molding of a molded article having a large thickness is difficult due to shrinkage and/or residual stress.

In order to obtain molded articles having a three-dimensional shape or complex shape, a method for molding a secondarily molded article having a desired shape, the method comprising: extruding and molding a resin material; producing a stock shape for machining (also referred to as "stock shape for cutting") having a shape, such as a plate, round bar, pipe, special shape, or another shape; and subjecting the stock shape for machining to machining, such as cutting, drilling, and shearing, has been known. The method of machining the stock shape for machining has advantages, including that molded articles can be produced in small quantities at a relatively low cost because an expensive die is not required, that frequent modifications in molded article specifications can be accommodated, that molded articles with high dimensional precision can be obtained, that molded articles having a complex shape or large thickness, which is not suitable for production using injection molding, can be produced, and the like.

However, not all resin materials and/or extrusion molded articles are suitable as stock shapes for machining. A stock shape for machining needs to satisfy high levels of required properties, such as having a large thickness and excellent machinability, having low residual stress, being capable of avoiding excessive heat generation that leads to deformation and/or discoloration due to heat of friction generated during machining, being capable of being machined with high precision, and the like.

In general, most of processing methods used in metallic materials are utilized in machining of polymeric stock shapes as it is. Even among extrusion molded products, an extrusion molded product that is thin and has great flexibility, such as a typical film, sheet, or tube, is unsuitable for machining such as cutting. Even among extrusion molded products having shapes, such as plate or round bar, with a large thickness or large diameter, if the extrusion molded product has excessively large residual stress during extrusion molding, the extrusion molded product readily deforms during or after machining, and it is difficult to obtain a secondarily molded article having high dimensional precision. Even among extrusion molded products having reduced residual stress, the extrusion molded product that readily breaks or cracks during machining, such as cutting, drilling, and shearing, is not suitable as a stock shape for machining.

In order to obtain, via extrusion molding, a stock shape for machining having properties suitable for machining, selection of resin materials, method of extrusion molding, or the like needs to be devised. Therefore, various extrusion molding methods for producing extrusion molded articles suitable as stock shapes for machining, the method using resin materials that contain general-purpose resins and/or engineering plastics, have been proposed so far.

For example, Patent Document 1 discloses a method for producing a stock shape for machining having a thickness or diameter exceeding 3 mm, the method comprising solid-state extrusion molding a resin composition containing an engineering plastic such as a polyether ether ketone, polyetherimide, polyphenylene sulfide, polysulfone, polyether sulfone, or polycarbonate.

On the other hand, degradable plastics have drawn attention as polymer materials that have little adverse effect on environment, and have been used in applications including extrusion molded articles such as films and sheets, blow molded articles such as bottles, injection molded articles, and the like. Recently, application of biodegradable plastics in stock shapes for machining has been increasingly demanded.

Polylactic acid is known as a representative biodegradable plastic, and due to its moderate degradation rate, it is a biodegradable plastic that is preferably used depending on the application or usage environment. In addition, since polylactic acid is a polymeric material obtained by polymerizing a lactic acid obtained by fermenting a sugar taken from a plant-derived raw material such as corn, it has a carbon offset property that prevents increases in the amount of emission of $CO_2$, which is a greenhouse gas circulating within the global environment, even when subjected to combustion treatment.

Incidentally, as the concern over resource constraints increases, there have been progressive increases in the depth and size of downholes (underground bore; hole provided to form a well such as an oil well or a gas well) provided to perform well drilling and completion to recover hydrocarbon resources from layers of the earth containing hydrocarbon resources (also simply called "petroleum" in the present invention) such as petroleum (such as shale oil) or gas (such as shale gas). For example, in horizontal boreholes formed laying almost horizontally in a shale reservoir or the like located below 1,000 m underground, a method of performing hydraulic fracturing (fracturing) has been widely used. Ball sealers for blocking a bore hole (fracture) formed by hydraulic fracturing and isolation plugs such as frac plugs, bridge plugs, packers, and cement retainers, which are downhole tools for well drilling and completion (also simply called "downhole tools" hereafter) installed in a downhole to perform hydraulic fracturing, are used to block locations near the tip of the downhole or locations where hydraulic fracturing was performed previously, and after hydraulic fracturing is newly performed again and a bore hole (fracture) is formed, these materials are recovered or broken. Therefore, downhole tool members for well drilling and completion (also simply called "downhole tool members" hereafter) provided on a downhole tool such as a ball sealer or an isolation plug are required to have strength capable of tolerating hydraulic fracturing or construction (for example, tensile strength) and to be cost-effective and easy to recover or break.

Typically, isolation plugs such as frac plugs, bridge plugs, packers, and cement retainers (also simply called "plugs" hereafter) have structures in which a rubber blocking member is attached around a plug core rod (also called "mandrel"), and the blocking mechanism of the isolation plug achieves a blocking effect by changing the shape of the rubber by tension and/or compression of the core rod (mandrel) (Patent Documents 2 and 3). The maximum size of the plug core rod (mandrel) is the inside diameter of the downhole, and the plug mandrel can have any predetermined outside diameter as long as a rubber blocking member can be attached around the plug mandrel. In many cases, the size of the plug mandrel is from 70 to 100 mm. Furthermore, the plug core rod (mandrel) often has a hollow shape in order to pass mud therethrough. The hollow diameter is, in many cases, from 10 to 50 mm, typically 19.1 mm (0.75 inches), 25.4 mm (1 inch), or 31.8 min (1.25 inches), and the mandrel has a shape comprising, for example, a main part having a pipe-like shape of approximately 1,000 mm in length, and a diameter expanded part at both ends so that a jig for performing tension and/or compression of the core rod (mandrel) can be engaged. During the tension and/or compression of the plug core rod (mandrel), a high load of approximately 1,500 to 5,000 kgf (approximately 14,700 to 49,000 N) and, in many cases, approximately 2,000 to 4,500 kgf (approximately 19,600 to 44,100 N) is applied to the core rod (mandrel). In particular, since 2 to 5 times the stress concentration is applied to the aforementioned diameter expanded part (engagement part with a jig) of the core rod (mandrel), a material having a strength that can tolerate such a high load must be selected.

After performing hydraulic fracturing, a method of retrieving the blocking member or breaking the core rod (mandrel) to form an opening is employed. Since metals such as cast iron have conventionally been used as the plug core rods (mandrels), the retrieval of isolation plugs involved high cost, and the breaking of the metal core rods (mandrels) also involved difficulty and high cost. Epoxy resin composite materials and the like have also been used as plug core rods (mandrels). However, even in resin composite materials such as epoxy resin composite materials, problems such as insufficient strength and the high cost required to retrieve the blocking member remain the same. In addition, there is a problem that, since resins and reinforced materials (such as carbon fibers and metal fibers) after breaking the core rods (mandrels) are non-degradable, it is practically impossible to treat and/or dispose of the resin composite materials.

In addition, relatively small ball sealers having a diameter of 16 to 32 mm and being formed from non-degradable materials such as aluminum or non-degradable plastics such as nylon or phenol resins coated as necessary with rubber to improve sealing properties have been conventionally used as ball sealers. However, in recent years, in step with increases in the depth and size of downholes, there is an increasing demand for ball sealers having an even greater diameter—for example, a diameter of 25 to 100 mm or an even greater diameter—and having a strength capable of tolerating a high load.

The use of degradable plastics as downhole tool members or ball sealers (also called "downhole tool members and the like" hereafter) is expected since degradable plastics can be disintegrated by leaving them in the downhole without recovering them to above ground after use. Specifically, there is a demand for a degradable plastic which has sufficient strength in environments exceeding 1,000 m underground (environments at temperatures exceeding 65° C. or the like), is capable of forming a downhole tool member or the like of a desired shape, and can decompose in environments at a variety of depths (that is, environments at a variety of temperatures), and a molded article thereof.

However, when a molded article of a downhole tool member or the like is produced with a general-purpose resin molding method such as injection molding, compression molding, or melt extrusion molding using a degradable plastic, most of which are crystalline resins, sink marks or voids are generated by thermal contraction after formation or shrinkage associated with crystallization, and the necessary dimensional precision cannot be achieved. Therefore, in order to obtain a downhole tool member or the like, attention has been focused on methods of performing machining such as cutting on a solid-state extrusion molded article with a large thickness or diameter formed by solidification and extrusion-molding from a degradable plastic.

The use of polylactic acid, which is a typical biodegradable plastic, in wells for oil drilling or the like is well known. Patent Document 4 discloses a viscous well treatment fluid containing polylactic acid, sand control screening or coating, and machinery disposed inside a well formed from polylactic acid or a part thereof, and a packer, a bridge plug, a cement retainer, or the like is disclosed as machinery.

It is further described in Patent Document 4 that the flexural strength of a rodlike body produced by injection molding from a crystalline poly-D-lactide (polylactic acid) is within the range of from 40 to 140 MPa and that a rodlike body formed by solidification and extrusion has a flexural strength up to 200 MPa, and this document references "Biomaterials 17 (March 1996, 529-535)" (Non-Patent Document 1). A rodlike body with a circular cross section produced by solidification and extrusion and consisting of a poly-D-lactide with a Mv (viscosity average molecular weight) of 160,000 is described in Non-Patent Document 1 as an "enhancement in the mechanical properties of polylactic acid by solidification and extrusion", and mechanical properties such as the yield flexural strength of a solid-state extrusion molded article, which is a round barlike body with a diameter of 4 mm, is specifically disclosed.

It is not possible to form a downhole tool member or the like with a shape and size required by increases in the depth and size of downholes in recent years from the solid-state extrusion molded article, which is a round barlike body with a diameter of 4 mm, specifically disclosed in Non-Patent Document 1. In addition, since the glass transition temperature of polylactic acid is from 55 to 60° C., it is unclear whether a solid-state extrusion molded article of a rodlike body or the like formed from the poly-D-lactide disclosed in Patent Document 4 or Non-Patent Document 1 would be able to form a downhole tool member or the like with a desired shape having sufficient strength in environments exceeding 1,000 m underground (environments at temperatures exceeding 65° C. or the like) described above.

CITATION LIST

Patent Literature

Patent Document 1: Japanese Unexamined Patent Application Publication No. 2005-226031A (corresponding to US Patent Application Publication No. 2008/038517 specification)
Patent Document 2: US Patent Application Publication No. 2005/205265 A1 specification
Patent Document 3: US Patent Application Publication No. 2011/277989 A1 specification
Patent Document 4: US Patent Application Publication No. 2004/231845 A1 specification Non-Patent Document Non-Patent Document 1: "Enhancement of the mechanical properties of polylactides by solid state extrusion", Biomaterials 1996, Vol. 17, No. 5 (1996), pp. 529-535

SUMMARY OF INVENTION

Technical Problem

The problem of the present invention is to provide a solid-state extrusion molded article of a degradable plastic capable of forming a secondary molded article of a desired shape by machining such as cutting, drilling, or shearing—in particular a downhole tool member or the like of a desired shape having sufficient strength in environments exceeding 1,000 m underground (environments at temperatures exceeding 65° C. or the like)—a production method of the same, and a use application of the same.

Solution to Problem

As a result of conducting dedicated research in order to solve the problem described above, the present inventors discovered that by selecting a polylactic acid with a high ratio of L-lactic acid, a solid-state extrusion molded article having excellent strength in environments exceeding 1,000 m underground (environments at temperatures exceeding 65° C. or the like), which cannot be expected from the solid-state extrusion molded article formed from poly-D-lactic acid disclosed in Patent Document 4, can be obtained, and thereby completed the present invention.

That is, the present invention provides a poly-L-lactic acid solid-state extrusion molded article comprising a resin material containing a poly-L-lactic acid having a weight average molecular weight of from 100,000 to 380,000 and a melt viscosity of from 20 to 2,000 Pa·s as measured at a temperature of 240° C. and a shear rate of 120 sec$^{-1}$ and having an L-form content of from 80 to 100%, the article having a thickness or diameter of from 10 to 500 mm and a tensile strength of from 5 to 100 MPa at a temperature of 66° C.

As an embodiment of the present invention, a poly-L-lactic acid solid-state extrusion molded article in which the resin material is a poly-L-lactic acid composition containing from 5 to 70 mass % of a filler based on the total amount is provided.

In addition, the present invention provides a poly-L-lactic acid solid-state extrusion molded article comprising a resin material containing (a) a poly-L-lactic acid having a weight average molecular weight of from 100,000 to 380,000 and a melt viscosity of from 20 to 2,000 Pa·s as measured at a temperature of 240° C. and a shear rate of 120 sec$^{-1}$ and having an L-form content of from 80 to 100%, and (b) from 5 to 70 mass % of a filler based on the total amount, the article having a thickness or diameter of from 10 to 500 mm and a tensile strength of from 5 to 200 MPa at a temperature of 66° C.

As an embodiment, the present invention provides the poly-L-lactic acid solid-state extrusion molded articles of (1) to (6) below.
(1) The aforementioned poly-L-lactic acid solid-state extrusion molded article, wherein the filler is a fibrous filler.
(2) The aforementioned poly-L-lactic acid solid-state extrusion molded article, wherein the filler has an aspect ratio of at least 100.
(3) The aforementioned poly-L-lactic acid solid-state extrusion molded article, wherein the resin material contains from 40 to 200 parts by mass of poly-D-lactic acid having a weight average molecular weight of from 100,000 to 380,000 and a melt viscosity of from 20 to 2,000 Pa·s as measured at a temperature of 240° C. and a shear rate of 120 sec$^{-1}$ and having a D-form ratio of from 80 to 100% per 100 parts by mass of the poly-L-lactic acid.
(4) The aforementioned poly-L-lactic acid solid-state extrusion molded article, wherein the poly-L-lactic acid and poly-D-lactic acid form a stereocomplex.
(5) The aforementioned poly-L-lactic acid solid-state extrusion molded article having a round bar, hollow, or flat shape.
(6) The aforementioned poly-L-lactic acid solid-state extrusion molded article, the article being a stock shape for machining.

Furthermore, the present invention provides a ball sealer for well drilling and completion or a downhole tool member for well drilling and completion having a diameter of from 20 to 200 mm formed by machining the poly-L-lactic acid solid-state extrusion molded article serving as a stock shape for machining, and further provides an isolation plug provided with the downhole tool member for well drilling and completion.

In addition, the present invention provides isolation plugs provided with the downhole tool members for well drilling and completion of (i) to (xiv) below as specific aspects of the isolation plug provided with the downhole tool member for well drilling and completion.
(i) The aforementioned isolation plug, wherein the downhole tool member for well drilling and completion is at least one type selected from the group consisting of
a. a mandrel;
b. a pair of rings placed on an outer peripheral surface orthogonal to an axial direction of the mandrel; and
c. a slip and/or a wedge placed at a position between the pair of rings on the outer peripheral surface orthogonal to the axial direction of the mandrel.
(ii) The aforementioned isolation plug, wherein the mandrel has a hollow part along the axial direction.
(iii) The aforementioned isolation plug, wherein a ratio of the outside diameter of the hollow part of the mandrel to the diameter of the mandrel is at most 0.7.
(iv) The aforementioned isolation plug, wherein the mandrel and one ring of the pair of rings are formed integrally.
(v) The aforementioned isolation plug, wherein a radius of curvature of a machined portion of the outer peripheral surface of the mandrel is at least 0.5 mm.
(vi) The aforementioned isolation plug, wherein the outer peripheral surface of the mandrel has partially protected by a metal.

(vii) The aforementioned isolation plug, wherein a slip and a wedge are not provided on the outer peripheral surface of the mandrel.
(viii) The aforementioned isolation plug provided with at least one combination of a slip and a wedge placed at a position between the pair of rings on the outer peripheral surface orthogonal to the axial direction of the mandrel.
(ix) The aforementioned isolation plug provided with a plurality of combinations of slips and wedges.
(x) The aforementioned isolation plug provided with at least one diameter expandable circular rubber member placed at a position between the pair of rings on the outer peripheral surface orthogonal to the axial direction of the mandrel.
(xi) The aforementioned isolation plug, wherein a length of the diameter expandable circular rubber member in the axial direction of the mandrel is from 10 to 70% with respect to a length of the mandrel.
(xii) The aforementioned isolation plug, wherein the mandrel has a fixing part for fixing the diameter expandable circular rubber member to the outer peripheral surface in a compressed state.
(xiii) The aforementioned isolation plug, wherein the fixing part is at least one type selected from the group consisting of a groove, a stepped part, and a screw thread.
(xiv) The aforementioned isolation plug provided with a plurality of diameter expandable circular rubber members.

Furthermore, the present invention provides a method for producing a poly-L-lactic acid solid-state extrusion molded article having a thickness or diameter of from 10 to 500 mm and a tensile strength of from 5 to 100 MPa at a temperature of 66° C., the method comprising steps 1 to 4 below:
1) a step 1 of supplying a resin material containing poly-L-lactic acid having a weight average molecular weight of from 150,000 to 540,000 and a melt viscosity of from 30 to 3,000 Pa·s as measured at a temperature of 240° C. and a shear rate of 120 sec and having an L-form ratio of from 80 to 100% to an extruder and melt-kneading the resin material at an extruder cylinder temperature of from 195 to 260° C.;
2) a step 2 of extruding the resin material melted by melt-kneading from an extrusion die at a tip of the extruder into a flow path of a forming die comprising a cooling means and a flow path that communicates with a path of the melted resin of the extrusion die and that has a cross-sectional shape of an extrusion-molded article;
3) a step 3 of solidifying the melted and extruded product consisting of the resin material by cooling in the flow path of the forming die and then extruding the solid-state extrusion molded product from the tip of the forming die to the outside; and
4) a step 4 of pressurizing the solid-state extrusion molded product and drawing the same while applying back pressure thereto in a direction of the forming die to suppress expansion of the solid-state extrusion molded product in a thickness direction or radial direction due to pressure so as to obtain a solid-state extrusion molded article having a thickness or diameter of from 10 to 500 mm.

As desired, the present invention also provides a method for producing a poly-L-lactic acid solid-state extrusion molded article having a thickness or diameter of from 10 to 500 mm and a tensile strength of from 5 to 200 MPa at a temperature of 66° C., the method comprising steps 1 to 4 below:
1') a step 1' of supplying a resin material containing (a) poly-L-lactic acid having a weight average molecular weight of from 150,000 to 540,000 and a melt viscosity of from 30 to 3,000 Pa·s as measured at a temperature of 240° C. and a shear rate of 120 sec$^{-1}$ and having an L-form ratio of from 80 to 100% and (b) from 5 to 70 mass % of a filler based on the total weight (the total amount of the resin material being defined as 100 mass %) to an extruder and melt-kneading the resin material at an extruder cylinder temperature of from 195 to 260° C.;
2) a step 2 of extruding the resin material melted by melt-kneading from an extrusion die at a tip of the extruder into a flow path of a forming die comprising a cooling means and a flow path that communicates with a path of the melted resin of the extrusion die and that has a cross-sectional shape of an extrusion-molded article;
3) a step 3 of solidifying the melted and extruded product consisting of the resin material by cooling in the flow path of the forming die and then extruding the solid-state extrusion molded product from the tip of the forming die to the outside; and
4) a step 4 of pressurizing the solid-state extrusion molded product and drawing the same while applying back pressure thereto in a direction of the forming die to suppress expansion of the solid-state extrusion molded product in a thickness direction or radial direction due to pressure so as to obtain a solid-state extrusion molded article having a thickness or diameter of from 10 to 500 mm.

The present invention provides the aforementioned production method further comprising a step 5 of heat-treating the poly-L-lactic acid solid-state extrusion molded article obtained in step 4 for 3 to 24 hours at a temperature of from 90 to 190° C.

In addition, the present invention further provides a well drilling and completion method in which the aforementioned ball sealer for well drilling and completion is used to perform blocking treatment on a well hole, and part or all of the ball sealer for well drilling and completion is then degraded; and a well drilling and completion method in which an isolation plug provided with the downhole tool member for well drilling and completion is used to perform blocking treatment thereon, and part or all of the downhole tool member for well drilling and completion is then degraded.

Advantageous Effects of Invention

The present invention is a poly-L-lactic acid solid-state extrusion molded article comprising a resin material containing a poly-L-lactic acid having a weight average molecular weight of from 100,000 to 380,000 and a melt viscosity of from 20 to 2,000 Pa·s as measured at a temperature of 240° C. and a shear rate of 120 sec$^{-1}$ and having an L-form content of from 80 to 100%, the article having a thickness or diameter of from 10 to 500 mm and a tensile strength of from 5 to 100 MPa or, if desired, from 5 to 200 MPa at a temperature of 66° C. This yields the effect that it is possible to provide a solid-state extrusion molded article of a degradable plastic which can be molded into a secondary molded article of a desired shape by machining such as cutting, drilling, or shearing—in particular a downhole tool member or the like for well drilling and completion provided on an isolation plug—has sufficient strength in environments exceeding 1,000 m underground (environments at temperatures exceeding 65° C. or the like), and can form a downhole tool member or the like of a desired shape.

BRIEF DESCRIPTION OF DRAWINGS

FIG. 1 is a schematic diagram illustrating a specific example of an isolation plug provided with a downhole tool member for well drilling and completion formed by machin-

DESCRIPTION OF EMBODIMENTS

1. Poly-L-Lactic Acid Solid-State Extrusion Molded Article

The poly-L-lactic acid solid-state extrusion molded article of the present invention is a poly-L-lactic acid solid-state extrusion molded article comprising a resin material containing a poly-L-lactic acid having a weight average molecular weight of from 100,000 to 380,000 and a melt viscosity of from 20 to 2,000 Pa·s as measured at a temperature of 240° C. and a shear rate of 120 sec$^{-1}$ and having an L-form content of from 80 to 100%, the article having a thickness or diameter of from 10 to 500 mm and a tensile strength of from 5 to 100 MPa or, if desired, from 5 to 200 MPa at a temperature of 66° C.

A polylactic acid is a polymer containing lactic acid repeating units expressed by Formula 1: —(—O—C*HCH$_3$—CO—)—. Since the carbon atoms expressed by "C*" in Formula 1 are asymmetric carbon atoms, the lactic acid repeating units are both the L-form and the D-form, which are optical isomers. Accordingly, types of polylactic acids include poly-L-lactic acids, which contain only L-lactic acid units, poly-D-lactic acids, which contain only D-lactic acid units, and poly-D,L-lactic acids, which contain L-lactic acid units and D-lactic acid units as lactic acid repeating units.

(Poly-L-Lactic Acid)

The poly-L-lactic acid contained in the poly-L-lactic acid solid-state extrusion molded article of the present invention is a polylactic acid having an L-form ratio of from 80 to 100%—that is, a polylactic acid containing from 80 to 100% L-lactic acid units and from 0 to 20% D-lactic acid units (however, the total of L-lactic acid units and D-lactic acid units must be 100%) (a poly-L-lactic acid having an L-form ratio of from 80 to 100% is also simply called a "poly-L-lactic acid" hereafter). The percentage of L-lactic acid units in the poly-L-lactic acid is preferably from 85 to 100%, more preferably from 90 to 100%, and even more preferably from 93 to 100%, and the percentage of L-lactic acid units in the poly-L-lactic acid may also be 100%. When the percentage of L-lactic acid units in the poly-L-lactic acid is too small, the tensile strength of the solid-state extrusion molded article at a temperature of 66° C. may be insufficient, or it may be difficult to form a solid-state extrusion molded article having a thickness or diameter of from 10 to 500 mm. Furthermore, the solid-state extrusion molded article that is formed may split or break.

The percentage of lactic acid repeating units (which refers to the total of L-lactic acid units and D-lactic acid units) in the poly-L-lactic acid contained in the poly-L-lactic acid solid-state extrusion molded article of the present invention is ordinarily over 50 mass %, preferably at least 70 mass %, more preferably at least 80 mass %, even more preferably at least 90 mass %, particularly preferably at least 95 mass %, and most preferably at least 99 mass %, and the percentage may also be 100 mass %. Therefore, the poly-L-lactic acid used to form the poly-L-lactic acid solid-state extrusion molded article of the present invention is a polymer containing repeating units other than lactic acid repeating units in an amount of ordinarily less than 50 mass %, preferably at most 30 mass %, more preferably at most 20 mass %, even more preferably at most 10 mass %, particularly preferably at most 5 mass %, and most preferably at most 1 mass %, and the polymer may also contain no repeating units other than lactic acid repeating units whatsoever. When the percentage of lactic acid repeating units is less than 50 mass %, the substance exhibits a tendency in which the tensile strength, toughness, crystallinity, heat resistance, and the like are unbalanced or diminished.

Examples of repeating units other than lactic acid repeating units include, but are not limited to, repeating units derived from glycolic acid (or glycolide, which is a dimer thereof), ethylene oxalate, lactones, trimethylene carbonate, 1,3-dioxane, or the like.

The poly-L-lactic acid contained in the poly-L-lactic acid solid-state extrusion molded article of the present invention is preferably a high molecular weight polymer. That is, the weight average molecular weight of the poly-L-lactic acid contained in the poly-L-lactic acid solid-state extrusion molded article of the present invention is from 100,000 to 380,000, preferably from 120,000 to 360,000, more preferably from 140,000 to 340,000, even more preferably from 160,000 to 320,000, and particularly preferably from 180,000 to 300,000. Furthermore, the melt viscosity of the resin material contained in the poly-L-lactic acid solid-state extrusion molded article of the present invention as measured at a temperature of 240° and a shear rate of 120 sec$^{-1}$ is from 20 to 2,000 Pa·s, preferably from 50 to 1,800 Pa·s, more preferably from 80 to 1,600 Pa·s, even more preferably from 100 to 1,400 Pa·s, and particularly preferably from 120 to 1,200 Pa·s. The weight average molecular weight of the poly-L-lactic acid is measured by gel permeation chromatography (GPC). The melt viscosity of the poly-L-lactic acid as measured at a temperature of 240° and a shear rate of 120 sec$^{-1}$ is measured using a capillograph.

When the weight average molecular weight and/or the melt viscosity is too low, the flexibility or toughness of the solid-state extrusion molded article are low, and cracks may be formed at the time of machining, or cracks may be formed at the time of the heat treatment (annealing) of the solid-state extrusion molded article. In addition, melt extrusion or solidification and extrusion molding are difficult. When the weight average molecular weight and/or the melt viscosity is too high, the thermal degradation of the poly-L-lactic acid easily occurs since the poly-L-lactic acid must be heated to a high temperature at the time of melt extrusion.

(Resin Component)

The resin material contained in the poly-L-lactic acid solid-state extrusion molded article of the present invention is a resin composition containing poly-L-lactic acid in an amount of at least 25 mass % and preferably as the main component. The "main component" means that the content ratio of the poly-L-lactic acid in the resin component is typically at least 50 mass %, preferably at least 70 mass %, more preferably at least 80 mass %, and even more preferably at least 90 mass %. Examples of another resin components other than poly-L-lactic acid in the resin material include thermoplastic resins other than poly-L-lactic acid and other biodegradable resins such as, for example, polyglycolic acid, polycaprolactone, polyhydroxyalkanoate, modified polyvinyl alcohol, casein, modified starch, and polyethylene terephthalate copolymers. A resin composition in which the content ratio of poly-L-lactic acid in the resin component is 100 mass % is particularly preferable.

Depending on the application, the resin material may also contain a poly-D-lactic acid as another resin component other than poly-L-lactic acid in the resin material. For example, when the resin material contained in the poly-L-lactic acid solid-state extrusion molded article of the present invention contains a mixture of poly-L-lactic acids and poly-D-lactic acids, the resin material has a high melting point, which yields an improvement in thermal stability and crystallinity in comparison to when the resin material contains only poly-L-lactic acids or poly-D-lactic acids. In particular, it is known that when poly-L-lactic acids and poly-D-lactic acids are mixed, the respective molecular chains engage favorably to form a stereocomplex (also called a "stereocomplex-type polylactic acid"), and the heat resistance thereby increases. With the present invention, it is possible to provide a poly-L-lactic acid solid-state extrusion molded article in which poly-L-lactic acids and poly-D-lactic acids form a stereocomplex.

When the resin material contained in the poly-L-lactic acid solid-state extrusion molded article of the present invention contains poly-D-lactic acids together with poly-L-lactic acids, it preferably contains from 40 to 200 parts by mass of the poly-D-lactic acids, more preferably contains from 60 to 150 parts by mass of the poly-D-lactic acids, and even more preferably contains from 80 to 125 parts by mass of the poly-D-lactic acids from the perspective of improving heat resistance by forming a stereocomplex. When the resin material contains poly-L-lactic acids and a poly-D-lactic acids, the total content ratio of the poly-L-lactic acids and poly-D-lactic acids in the resin component is preferably at least 50 mass %, and in the case of a poly-L-lactic acid solid-state extrusion molded article in which the poly-L-lactic acids and poly-D-lactic acids form a stereocomplex, the total content ratio of the poly-L-lactic acids and poly-D-lactic acids in the resin component is preferably at least 80 mass %, more preferably at least 90 mass %, and most preferably at least 95 mass %.

Here, as described previously with regard to the poly-L-lactic acid, a poly-D-lactic acid refers to a polylactic acid having a D-form ratio of from 80 to 100%, that is, containing from 80 to 100% D-lactic acid units and from 0 to 20% L-lactic acid units (where the total of D-lactic acid units and L-lactic acid units is defined as 100%) as repeating units. The percentage of D-lactic acid units in the poly-D-lactic acid is preferably from 85 to 100%, more preferably from 90 to 100%, and even more preferably from 93 to 100%, and the percentage of D-lactic acid units in the poly-D-lactic acid may also be 100%. The percentage of lactic acid repeating units (which refers to the total of L-lactic acid units and D-lactic acid units) in the poly-D-lactic acid is ordinarily over 50 mass %, preferably at least 70 mass %, more preferably at least 80 mass %, even more preferably at least 90 mass %, particularly preferably at least 95 mass %, and most preferably at least 99 mass %, and the percentage may also be 100 mass %. Therefore, the poly-D-lactic acid is a polymer containing repeating units other than lactic acid repeating units in an amount of ordinarily less than 50%, preferably at most 30 mass %, more preferably at most 20 mass %, even more preferably at most 10 mass %, particularly preferably at most 5 mass %, and most preferably at most 1 mass %, and the polymer may also contain no repeating units other than lactic acid repeating units whatsoever. The repeating units other than lactic acid repeating units are the same as those described previously with regard to the poly-L-lactic acid.

The poly-D-lactic acid preferably contained in the resin material contained in the poly-L-lactic acid solid-state extrusion molded article of the present invention is a poly-D-lactic acid having a weight average molecular weight of from 100,000 to 380,000 and a melt viscosity of from 20 to 2,000 Pa·s as measured at a temperature of 240° C. and a shear rate of 120 sec$^{-1}$ and having a D-form ratio of from 80 to 100%. Even more preferable ranges of the weight average molecular weight or the melt viscosity of the poly-D-lactic acid are the same as those described previously with regard to the poly-L-lactic acid.

Accordingly, the poly-L-lactic acid solid-state extrusion molded article of the present invention may be a poly-L-lactic acid solid-state extrusion molded article in which the resin material contains from 40 to 200 parts by mass of poly-D-lactic acid having a weight average molecular weight of from 100,000 to 380,000 and a melt viscosity of from 20 to 2,000 Pa·s as measured at a temperature of 240° C. and a shear rate of 120 sec$^{-1}$ and having a D-form ratio of from 80 to 100% per 100 parts by mass of the poly-L-lactic acid. In particular, the poly-L-lactic acid solid-state extrusion molded article of the present invention may be a poly-L-lactic acid solid-state extrusion molded article in which the poly-L-lactic acid and the poly-D-lactic acid forms a stereocomplex.

(Filler)

The resin material contained in the poly-L-lactic acid solid-state extrusion molded article of the present invention may contain a filler for the purpose of enhancing mechanical strength or heat resistance. As the filler, fibrous fillers and granular or powdered fillers can be used; however, fibrous fillers are preferable.

(Fibrous Filler)

Examples of fibrous fillers include inorganic fibrous substances such as glass fibers, carbon fibers, asbestos fibers, silica fibers, alumina fibers, zirconia fibers, boron nitride fibers, silicon nitride fibers, boron fibers, and potassium titanate fibers; metal fibrous substances such as stainless steel, aluminum, titanium, steel, and brass; and organic fibrous substances with a high melting point such as aramid fibers, kenaf fibers, polyamides, fluorine resins, polyester resins, and acrylic resins; and the like. Short fibers having a length (weight average) of at most 10 mm, preferably from 1 to 6 mm, and more preferably from 1.5 to 4 mm and a diameter of from 2 to 50 μm, preferably from 5 to 40 μm, and more preferably from 7 to 30 μm are preferably used as the fibrous filler. In addition, inorganic fibrous substances are preferably used, and glass fibers are particularly preferable. The length (weight average fiber length) of the fibrous filler is determined by a known measurement method. That is, the resin component is removed by performing ashing treatment at a high temperature (approximately 500° C.) or solvent extraction treatment on the resin material contained in the fibrous filler, and a microscopic image of the remaining fibrous filler is subjected to image analysis to calculate the weight average length.

Furthermore, the poly-L-lactic acid solid-state extrusion molded article of the present invention may contain a fibrous filler with a large aspect ratio—specifically, a fibrous filler derived from long fibers—as a filler in the solid-state extrusion molded article so as to form a solid-state extrusion molded article having a larger tensile strength at a temperature of 66° C. Here, the aspect ratio of the filler is defined as the ratio of the length (weight/average)/diameter of a fibrous filler, for example, and is itself a known characteristic of fillers.

(Filler Having an Aspect Ratio of at Least 100)

That is, the poly-L-lactic acid solid-state extrusion molded article of the present invention may contain a filler having an aspect ratio of at least 100—for example, a fibrous filler having an aspect ratio of preferably at least 150, more preferably at least 200, and even more preferably at least 250—in the solid-state extrusion molded article so as to form a poly-L-lactic acid solid-state extrusion molded article having a thickness or diameter of from 10 to 500 mm and a tensile strength of from 5 to 200 MPa at a temperature of 66° C., for example. The upper limit of the aspect ratio of a filler having an aspect ratio of at least 100 is not particularly limited, but when the diameter of the filler is too small, there is a risk that the enhancing effect on the mechanical strength of the poly-L-lactic acid solid-state extrusion molded article may be insufficient, so the aspect ratio is ordinarily less than 1,000 and, in most cases, less than 800.

The method of obtaining a filler having an aspect ratio of at least 100 is not limited as long as the filler has an aspect ratio of at least 100 in the poly-L-lactic acid solid-state extrusion molded article of the present invention, and a method such as producing a poly-L-lactic acid solid-state extrusion molded article using resin pellets containing a fibrous filler produced by extruding a resin material containing a poly-L-lactic acid in a strand shape so as to enclose long fibers while drawing out the long fibers and then cutting the material to a prescribed length may be used. As resin pellets produced by the method described above, a pellet-like resin compound containing glass fibers (fibrous filler) with a diameter of 10 μm and a length (weight average) of approximately 3 mm is obtained by preparing pellets with a length of 3 mm using long glass fibers with a diameter of 10 μm, for example. By producing a poly-L-lactic acid solid-state extrusion molded article with the solidification and extrusion molding method described in detail below using this compound, it is possible to obtain a solid-state extrusion molded article containing a fibrous filler with a diameter of 10 μm and a length (weight average) of approximately 2.5 mm—that is, a fibrous filler with an aspect ratio (calculated as the length (2000 μm)/diameter (10 μm)=200)—as a fibrous filler contained in the poly-L-lactic acid solid-state extrusion molded article.

In addition, a fibrous filler contained in a poly-L-lactic acid solid-state extrusion molded article produced by blending a fibrous filler consisting of short glass fibers with a diameter of 10 μm and a length of 3 mm, into a resin material with a conventionally known method and melting and kneading the product to prepare pellets with a length of 3 mm and then using this pellet-like resin compound to produce the molded article, for example, is ordinarily a fibrous filler with a diameter of 10 μm and a length (weight average) of approximately 0.3 mm—that is, a fibrous filler with an aspect ratio of 30 (calculated as the length (300 μm)/diameter (10 μm)=30). The original length of the fibrous filler with short fibers is assumed to be diminished by the shearing effect or heating performed in the pellet preparation or solidification and extrusion molding process.

(Granular or Powdered Filler)

As a granular or powdered filler, mica, silica, talc, alumina, kaolin, calcium sulfate, calcium carbonate, titanium oxide, ferrite, clay, glass powder (milled fiber or the like), zinc oxide, nickel carbonate, iron oxide, quartz powder, magnesium carbonate, barium sulfate, and the like can be used.

Fillers such as fibrous fillers or granular or powdered fillers may each be used independently, or two or more types may be used in combination. The filler may be treated with a sizing agent or surface treatment agent as necessary. Examples of the sizing agent or surface treatment agent include functional compounds such as epoxy-based compounds, isocyanate-based compounds, silane-based compounds, and titanate-based compounds. These compounds may be used to perform surface treatment or sizing treatment on the filler in advance or may be added at the same time as the preparation of the resin composition.

For cases where the resin material contains the filler, the contained proportion of the filler is from 5 to 70 mass %, preferably from 10 to 60 mass %, more preferably from 15 to 50 mass %, and even more preferably from 20 to 40 mass %, in terms of the total mass. The filler can be melt-kneaded with the poly-L-lactic acid, but a poly-L-lactic acid composition (master batch) having a high filler concentration may also be optionally produced and diluted with a poly-L-lactic acid to prepare a resin material having the desired filler concentration. From the perspective of uniform dispersibility of the filler, it is preferable to prepare a resin material that is pelletized by melt-kneading the poly-L-lactic acid and the filler.

(Colorant)

In addition, the resin material contained in the poly-L-lactic acid solid-state extrusion molded article of the present invention may contain a colorant such as a dye or a pigment. By using a colorant, a poly-L-lactic acid solid-state extrusion molded article that is of high quality and that can be readily subjected to machining such as cutting can be obtained. As the colorant, a pigment is preferable from the perspective of having excellent heat resistance. As the pigment, pigments of various color tones, such as yellow pigments, red pigments, white pigments, and black pigments, which are used in the technical field of synthetic resin can be used. Among these pigments, carbon black is particularly preferable. Examples of the carbon black include acetylene black, oil furnace black, thermal black, channel black, and the like.

When the resin material contained in the poly-L-lactic acid solid-state extrusion molded article of the present invention contains a colorant, it is preferably a poly-L-lactic acid composition containing a colorant in an amount of from 0.001 to 5 mass % based on the total amount. The contained proportion of the colorant is preferably from 0.01 to 3 mass %, and more preferably from 0.05 to 2 mass %. The colorant can be melt-kneaded with the poly-L-lactic acid, but a poly-L-lactic acid composition (master batch) having a high colorant concentration may also be optionally produced and diluted with a poly-L-lactic acid to prepare a resin material having the desired colorant concentration. From the perspective of uniform dispersibility of the colorant, it is preferable to prepare a resin material that is pelletized by melt-kneading the poly-L-lactic acid and the colorant.

(Other Additives)

In the resin material used in the present invention, as other additives other than those described above, for example, impact modifiers, resin-modifying agents, corrosion inhibitors for die such as zinc carbonate and nickel carbonate, lubricants, thermosetting resins, antioxidants, ultraviolet absorbents, nucleating agents such as boron nitride, flame retardants, and the like can be suitably added.

(Tensile Strength at a Temperature of 66° C.)

The tensile strength of the poly-L-lactic acid solid-state extrusion molded article of the present invention at a temperature of 66° C. (also called the "tensile strength at 66° C." hereafter) is from 5 to 100 MPa. The tensile strength at 66° C. is preferably from 10 to 90 MPa, more preferably from 15 to 80 MPa, even more preferably from 20 to 70 MPa, and particularly preferably from 23 to 65 MPa.

The measurement of the tensile strength at 66° C. of the poly-L-lactic acid solid-state extrusion molded article is performed in an environment at a temperature of 66° C. in accordance with JIS K7113 and placing a test piece in an oven (units: MPa).

By setting the tensile strength at 66° C. of the poly-L-lactic acid solid-state extrusion molded article of the present invention to be from 5 to 100 MPa, it is possible to provide a solid-state extrusion molded article of a degradable polymer having sufficient strength even in the ground at high depths exceeding 1,000 m underground, for example.

Furthermore, as described above, with the present invention, it is possible to obtain a poly-L-lactic acid solid-state extrusion molded article comprising a resin material containing (a) a poly-L-lactic acid having a weight average molecular weight of from 100,000 to 380,000 and a melt viscosity of from 20 to 2,000 Pa·s as measured at a temperature of 240° C. and a shear rate of 120 sec$^{-1}$ and having an L-form content of from 80 to 100%, and (b) from 5 to 70 mass % of a filler based on the total amount, the article having a thickness or diameter of from 10 to 500 mm and a tensile strength of from 5 to 200 MPa at a temperature of 66° C. With this solid-state extrusion molded article, a solid-state extrusion molded article of a degradable polymer having sufficient strength even in the ground at higher depths is provided. The tensile strength at 66° C. of this solid-state extrusion molded article is preferably from 20 to 190 MPa, more preferably from 35 to 180 MPa, and even more preferably from 50 to 170 MPa.

That is, the poly-L-lactic acid solid-state extrusion molded article of the present invention can be suitably used to form a downhole tool member for well drilling and completion provided in an isolation plug such as a core rod (mandrel) of an isolation plug such as a frac plug, a bridge plug, a packer, or a cement retainer. During the tension and/or compression of the core rod (mandrel) of the isolation plug, a high load of approximately 1,500 to 5,000 kgf (approximately 14,700 to 49,000 N) and, in many cases, approximately 2,000 to 4,500 kgf (approximately 19,600 to 44,100 N) is applied to the core rod (mandrel). Since 2 to 5 times the stress concentration is applied to the aforementioned diameter expanded part (engagement part with a jig) of the core rod (mandrel), in particular, a strength that can tolerate a load of approximately 3,000 to 25,000 kgf (approximately 29,400 to 245,000 N) and, in many cases, approximately 4,000 to 20,000 kgf (approximately 39,200 to 196,000 N) in a high-temperature environment at a high depth exceeding 1,000 m underground is required.

Since the isolation plug core rod (mandrel) often has a hollow shape as described above, the core rod (mandrel) supports the aforementioned high load with the cross-sectional area of a hollow cross section. When the tensile strength at 66° C. of the poly-L-lactic acid solid-state extrusion molded article of the present invention is at least 5 MPa, this means that the cross-sectional area of a hollow cross section of the core rod (mandrel) of the isolation plug is approximately 3,000 mm$^2$ and that the mandrel can tolerate a load of approximately 1,531 kgf (approximately 15,000 N) in an environment at a temperature of 66° C. Therefore, the poly-L-lactic acid solid-state extrusion molded article of the present invention having a tensile strength of from 5 to 100 MPa or from 5 to 200 MPa at 66° C. as desired is able to sufficiently tolerate the stress applied to the isolation plug core rod (mandrel) having a typical size (cross-sectional area) in a high-temperature environment at a high depth exceeding 1,000 m underground. From a practical standpoint, it is preferable that there is no breakage in the isolation plug core rod (mandrel) in a tensile test in which a load of approximately 3,500 kgf (approximately 34,300 N) is applied at a temperature of 66° C. In addition, a poly-L-lactic acid solid-state extrusion molded article having a tensile strength exceeding 200 MPa at 66° C. is, in many cases, very difficult to produce or machine.

The poly-L-lactic acid solid-state extrusion molded article of the present invention is a solid-state extrusion molded article having a thickness or diameter of from 10 to 500 mm, and the thickness or diameter is preferably from 15 to 300 mm, more preferably from 20 to 250 mm, and even more preferably from 25 to 200 mm. Furthermore, solid-state extrusion molded articles of various shapes such as a round bar, a plate, a hollow article such as a pipe, or a special shape can be obtained as shapes of the poly-L-lactic acid solid-state extrusion molded article of the present invention. However, from the perspective of easy solidification and extrusion molding and subsequent densification processing, and from the perspective of having many qualities suitable for a solid-state extrusion molded article serving as a stock shape for machining, the solid-state extrusion molded article preferably has a round bar, hollow, or flat plate shape. A round bar shape is more preferable for forming a downhole tool member for well drilling and completion or, in particular, an isolation plug core rod (mandrel) or a ball sealer described below.

2. Production Method for Poly-L-Lactic Acid Solid-State Extrusion Molded Article The poly-L-lactic acid solid-state extrusion molded article of the present invention can be produced by a production method comprising steps 1 to 4 described in 1) to 4) below: A production method for a poly-L-lactic acid solid-state extrusion molded article having a thickness or diameter of from 10 to 500 mm and a tensile strength of from 5 to 100 MPa at a temperature of 66° C., the method comprising:

1) a step 1 of supplying a resin material containing poly-L-lactic acid having a weight average molecular weight of from 150,000 to 540,000 and a melt viscosity of from 30 to 3,000 Pa·s as measured at a temperature of 240° C. and a shear rate of 120 sec$^{-1}$ and having an L-form ratio of from 80 to 100% to an extruder and melt-kneading the resin material at an extruder cylinder temperature of from 195 to 260° C.;

2) a step 2 of extruding the resin material melted by melt-kneading from an extrusion die at a tip of the extruder into a flow path of a forming die comprising a cooling means and a flow path that communicates with a path of the melted resin of the extrusion die and that has a cross-sectional shape of an extrusion-molded article;

3) a step 3 of solidifying the melted and extruded product consisting of the resin material by cooling in the flow path of the forming die and then extruding the solid-state extrusion molded product from the tip of the forming die to the outside; and 4) a step 4 of pressurizing the solid-state extrusion molded product and drawing the same while applying back pressure thereto in a direction of the forming die to suppress expansion of the solid-state extrusion molded product in a thickness direction or radial direction due to pressure so as to obtain a solid-state extrusion molded article having a thickness or diameter of from 10 to 500 mm.

In addition, the poly-L-lactic acid solid-state extrusion molded article of the present invention can be produced by a production method comprising steps 1' to 4' described in 1') to 4) below: A production method for a poly-L-lactic acid solid-state extrusion molded article having a thickness or diameter of from 10 to 500 mm and a tensile strength of from 5 to 200 MPa at a temperature of 66° C., the method comprising:

a step 1' of supplying a resin material containing (a) poly-L-lactic acid having a weight average molecular weight of from 150,000 to 540,000 and a melt viscosity of from 30 to 3,000 Pa·s as measured at a temperature of 240° C. and a shear rate of 120 sec and having an L-form ratio of from 80 to 100% and (b) from 5 to 70 mass % of a filler based on the total weight (the total amount of the resin material being defined as 100 mass %) to an extruder and melt-kneading the resin material at an extruder cylinder temperature of from 195 to 260° C.;

2) a step 2 of extruding the resin material melted by melt-kneading from an extrusion die at a tip of the extruder into a flow path of a forming die comprising a cooling means and a flow path that communicates with a path of the melted resin of the extrusion die and that has a cross-sectional shape of an extrusion-molded article;

3) a step 3 of solidifying the melted and extruded product consisting of the resin material by cooling in the flow path of the forming die and then extruding the solid-state extrusion molded product from the tip of the forming die to the outside; and 4) a step 4 of pressurizing the solid-state extrusion molded product and drawing the same while applying back pressure thereto in a direction of the forming die to suppress expansion of the solid-state extrusion molded product in a thickness direction or radial direction due to pressure so as to obtain a solid-state extrusion molded article having a thickness or diameter of from 10 to 500 mm.

According to the present invention, a poly-L-lactic acid solid-state extrusion molded article having a thickness or diameter of from 10 to 500 mm and a tensile strength of from 5 to 100 MPa or, as desired, 5 to 200 MPa at a temperature of 66° C. can be obtained by combining and adjusting the weight average molecular weight and melt viscosity of the poly-L-lactic acid, the method of supplying the material to the extruder, the melt kneading conditions or extrusion conditions such as the temperature or retention time, the cooling conditions, the back pressure conditions or pressurizing conditions applied to the solid-state extrusion molded product, heat treatment conditions described below, and the like. The production steps for cases in which the poly-L-lactic acid solid-state extrusion molded article of the present invention has a round bar or flat plate shape will be described hereinafter. Poly-L-lactic acid solid-state extrusion molded articles of other shapes can be produced in the same manner.

[Step 1]

First, in step 1, a resin material containing poly-L-lactic acid having a weight average molecular weight of from 150,000 to 540,000 and a melt viscosity of from 30 to 3,000 Pa·s as measured at a temperature of 240° C. and a shear rate of 120 sec$^{-1}$ and having an L-form ratio of from 80 to 100% is supplied to an extruder. The weight average molecular weight or the melt viscosity of the poly-L-lactic acid ordinarily decreases in the process of obtaining a poly-L-lactic acid solid-state extrusion molded article via steps 1 to 4, so a poly-L-lactic acid having a weight average molecular weight of preferably from 180,000 to 510,000, more preferably from 210,000 to 480,000, even more preferably from 240,000 to 450,000, and particularly preferably from 270,000 to 420,000 and a melt viscosity of preferably from 75 to 2,700 Pa·s, more preferably from 120 to 2,400 Pa·s, even more preferably from 150 to 2,100 Pa·s, and particularly preferably from 180 to 1,800 Pa·s should be used as the poly-L-lactic acid supplied to the extruder.

In step 1, although the resin material containing the poly-L-lactic acid may be supplied to a hopper attached to a supply part of the extruder, the resin material containing the poly-L-lactic acid may also be preferably supplied to the extruder using a fixed-quantity feeder. That is, a fixed-quantity feeder is provided, and then a resin material is placed into a hopper thereof to supply the resin material from the fixed-quantity feeder into a supplying part (hopper) of an extruder at a constant rate. As the resin material, pellet is preferably used. The resin material is preferably sufficiently dried and dehumidified prior to molding. The dehumidification and drying conditions are not particularly limited, but it is preferable to employ a method of keeping the pellets in a dry atmosphere at a temperature of from 45 to 120° C. for 1 to 48 hours.

Subsequently, in the step 1, the resin material is melt-kneaded in the cylinder of the extruder. The cylinder temperature is adjusted to 195 to 260° C., preferably 200 to 250° C., and more preferably 205 to 240° C. In the present invention, the cylinder temperature refers to the maximum temperature in the cylinder of the extruder (referring to either higher temperature of the actual cylinder temperature or the resin temperature). For cases where a plurality of heating means are arranged, corresponding to a solid phase resin transportation part, a melting part, a liquid phase resin transportation part, and the like, in the cylinder of the extruder, temperature of each heating means may be made different from each other within the range described above, or the temperature of each heating means may be controlled to be identical.

(Step 1')

In addition, as described above, a step 1'—that is, a step 1' of supplying a resin material containing (a) poly-L-lactic acid having a weight average molecular weight of from 150,000 to 540,000 and a melt viscosity of from 30 to 3,000 Pa·s as measured at a temperature of 240° C. and a shear rate of 120 sec$^{-1}$ and having an L-form ratio of from 80 to 100% and (b) from 5 to 70 mass % of a filler based on the total weight (the total amount of the resin material being defined as 100 mass %) to an extruder and melt-kneading the resin material at an extruder cylinder temperature of from 195 to 260° C.—may be performed instead of step 1.

[Step 2]

Next, in step 2, the resin material melted by melt kneading is melt-extruded from an extrusion die at the tip of the extruder. The melted resin material from an extrusion die is extruded into a flow path of a forming die comprising cooling means and the flow path that communicates with a path of melted resin of the extrusion die and that has a cross-sectional shape of an extrusion molded article. The cross-sectional shape of the extrusion molded article is rectangular when the extrusion molded article has a flat plate shape; and the cross-sectional shape of the extrusion molded article is circular when the extrusion molded article has a round bar shape.

[Step 3]

Next, in step 3, the melted and extruded product formed from the resin material is solidified by cooling in the flow path of the forming die, and the solid-state extrusion molded product is then extruded from the tip of the forming die to outside. The extrusion rate is typically from 5 to 50 mm/10 minutes, and preferably from 10 to 40 mm/10 minutes.

In step 3, it is preferable to employ a method in which a forming die having heating means in addition to the cooling means is used; and the method comprises, first, heating the melted and extruded product in the flow path around an extrusion die outlet to a temperature of from 200 to 265° C. and preferably from 210 to 240° C. with the heating means and then cooling the melted and extruded product, particularly the surface part thereof, in the flow path to a temperature lower than a crystallization temperature of the poly-L- lactic acid to solidify the melted and extruded product by the cooling means. When the temperature around the extrusion die outlet is lowered rapidly, the progress of the crystallization of the poly-L-lactic acid may be delayed. By cooling the temperature in the vicinity of the extrusion die to a temperature within the range described above after heating, it is possible to promote crystallization of the melted and extruded product, particularly the surface part thereof. Also, by setting the extrusion die outlet temperature to be within the range described above, the temperature of the melted and extruded product, particularly the surface part thereof, that is in the flow path around the extrusion die outlet can be adjusted to a temperature within the range described above.

The extrusion-molded article is solidified by reducing the temperature of the surface portion thereof, in particular, to a temperature lower than the crystallization temperature of the poly-L-lactic acid. The crystallization temperature of the poly-L-lactic acid (crystallization temperature detected when the temperature is lowered from the molten state) is ordinarily approximately 105 to 125° C. The cooling temperature of the cooling means is preferably 100° C. or lower, and more preferably 95° C. or lower. The lower limit of the cooling temperature is preferably at 30° C., and more preferably at 40° C. When the resin material used in step 1 or step 1' contains a filler such as glass fibers, the crystallization temperature of the poly-L-lactic acid may increase due to melt kneading in the cylinder of the extruder, but even in this case, the cooling temperature is preferably kept within the range described above. The heating means comprise, for example, a heater as a heat source. The cooling means comprise, for example, a cooling water pipe that can circulate cooling water as a coolant.

[Step 4]

In step 4, the solid-state extrusion molded product is pressurized and drawn while back pressure is applied in the direction of the forming die to suppress the expansion of the solid-state extrusion molded product in the thickness direction or radial direction to obtain a poly-L-lactic acid solid-state extrusion molded article having a thickness or diameter of from 10 to 500 mm. The pressurizing means include, for example, a combination of upper rolls and lower rolls. The solid-state extrusion molded product can be pressurized by a method of placing the lower rolls on a stand and then applying a load on the upper rolls. The solid-state extrusion molded product may be also pressurized by a method of applying a load on the lower rolls in a direction toward upper part and applying a load on the upper rolls in a direction toward lower part.

By applying pressure, starting from the discharge port of the forming die, to the solid-state extrusion molded product that is extruded from the forming die with a group of rolls in which a plurality of rolls are combined, the expansion of the solid-state extrusion molded product in the thickness direction or radial direction can be suppressed, and back pressure can also be applied in the forming die direction. Also, back pressure can be applied to the solid-state extrusion molded article in the forming die direction by combining suitable loading means. The amount of the back pressure is typically in a range of 1,500 to 8,500 kg, preferably 1,600 to 8,000 kg, more preferably 1,800 to 7,000 kg, and even more preferably 2,000 to 6,000 kg. For cases where the diameter or thickness of the solid-state extrusion molded article is large, it is preferable to increase the back pressure to be applied. This back pressure can be measured as an external pressure of the die (pressure applied on the flow path).

By suppressing the expansion of the solid-state extrusion molded product in the thickness direction or radial direction utilizing this pressurization, a poly-L-lactic acid solid-state extrusion molded article having a tensile strength of from 5 to 100 MPa or, as desired, from 5 to 200 MPa at a temperature of 66° C. can be produced as the solid-state extrusion molded article that is ultimately obtained. After the pressurization, the solid-state extrusion molded article is drawn.

For cases where the solid-state extrusion molded article is a round bar, other than the method of pressurizing using a combination of the upper rolls and lower rolls described above, a method of arranging rolls to enclose the round bar-shaped solid-state extrusion molded article and then applying pressure on the rolls toward the center can be also used. Any method can be employed as the method of pressurizing the solid-state extrusion molded product discharged from the forming die as long as the method can apply back pressure in the forming die direction, can suppress expansion of the solid-state extrusion molded product in a thickness direction or radial direction by pressurization, and can adjust, for example, the thickness or diameter of the eventually resulting solid-state extrusion molded article to be in a range of 10 to 500 mm, preferably 15 to 300 mm, and more preferably 20 to 250 mm.

[Step 5]

The poly-L-lactic acid extrusion-molded article obtained in step 4 described above is preferably annealed by establishing a step 5 of heat-treating the extrusion-molded article at a temperature of from 90 to 190° C. for 3 to 24 hours. By this annealing treatment, it is possible to remove residual stress of the solid-state extrusion molded article and to avoid inconveniences, such as deformation caused in the solid-state extrusion molded article itself and deformation caused in the secondarily molded article after machining. The heat treatment temperature is preferably from 100 to 180° C., and more preferably from 110 to 170° C. The heat treatment time is preferably from 4 to 20 hours, and more preferably from 5 to 15 hours.

Although the poly-L-lactic acid solid-state extrusion molded article produced by the production method of the present invention can have various shapes such as a round bar, a flat plate, a hollow shape such as a pipe, or a special shape, from the perspective of easy solidification and extrusion molding and the subsequent densification processing, the perspective of having many qualities suitable as a stock shape for machining, and the perspective of easy processing into a core rod (mandrel) or a ball sealer of a blocking member, which is a preferable application, the solid-state extrusion molded article preferably has a round bar, hollow, or flat plate shape and more preferably has a round bar or hollow shape.

(Machining)

Examples of the machining that can be performed on the poly-L-lactic acid solid-state extrusion molded article include cutting, drilling, shearing, and combinations thereof. Broadly speaking, the cutting method may include drilling, in addition to cutting. Examples of the cutting method include turning, grinding, lathing, boring, and the like performed by using a single cutter. Examples of the cutting method making use of a multi-cutter include milling, drilling, thread cutting, gear cutting, diesinking, filing, and the like. In the present invention, drilling making use of a drill or the like may be distinguished from the cutting in some cases. Examples of the shearing method include shearing by a cutting tool (saw), shearing by abrasive grains, shearing by heating and melting, and the like. Besides these, ground finishing methods, plastic working methods such as punching making use of a knife-like tool and marking-off shearing, special working methods such as laser beam machining, and the like may also be applied.

When the poly-L-lactic acid solid-state extrusion molded article serving as a stock shape for machining has a round bar, flat plate, or hollow shape with a large thickness, machining typically comprises shearing the solid-state extrusion molded article to an appropriate size or thickness, grinding the sheared solid-state extrusion molded article to adjust its shape to a desired shape, and performing drilling at the required parts. The solid-state extrusion molded article is finally subjected to a finishing operation as necessary. However, the order of the machining is not limited to this order. When a smooth surface does not tend to be formed because of melting of the solid-state extrusion molded article due to frictional heat upon the machining, the machining is desirably performed while cooling a cut surface or the like. Excessive heat generated on the solid-state extrusion molded article by frictional heat can cause deformation and discoloration. Therefore, it is preferable to control the temperature of the solid-state extrusion molded article or surface to be machined to a temperature of 170° C. or lower, and more preferably to a temperature of 150° C. or lower.

3. Stock Shape for Machining

The poly-L-lactic acid solid-state extrusion molded article of the present invention having a thickness or diameter of from 10 to 500 mm and a tensile strength of from 5 to 100 MPa or, as desired, from 5 to 200 MPa at a temperature of 66° C. can be subjected to machining such as cutting, drilling, or shearing to form a stock shape for machining for molding into secondary molded articles such as various resin parts. Examples of secondary molded articles include various members used in a downhole (downhole tool for well drilling and completion or members thereof) used for the drilling of hydrocarbon resources such as petroleum or gas. For example, the poly-L-lactic acid solid-state extrusion molded article of the present invention can be machined and used as a stock shape for machining to form a downhole tool member for well drilling and completion or a ball sealer for well drilling and completion provided on a downhole tool for well drilling and completion. Specifically, it is possible to obtain a stock shape for machining as a round bar with a diameter of from 20 to 200 mm for forming a downhole tool for well drilling and completion or a member thereof or a ball sealer for well drilling and completion with a diameter of from 20 to 200 mm, or a hollow tube with an outside diameter of from 50 to 200 mm and an inside diameter of from 5 to 100 mm. In addition, a stock shape for machining in the form of a hollow tube with a shape in which the inside diameter is uniform and the outside diameter is enlarged at some parts such as the ends, for example, can be obtained as the hollow tube.

With the present invention, it is possible to obtain a ball sealer for well drilling and completion with a diameter of from 20 to 200 mm, a downhole tool for well drilling and completion, or a member thereof formed by performing machining such as cutting on a poly-L-lactic acid solid-state extrusion molded article serving as a stock shape for machining having a thickness or diameter of from 10 to 500 mm and a tensile strength of from 5 to 100 MPa or, as desired, from 5 to 200 MPa at a temperature of 66° C.

In addition, with the present invention, it is possible to obtain an isolation plug provided with a downhole tool for well drilling and completion or a member thereof formed from a poly-L-lactic acid solid-state extrusion molded article having a thickness or diameter of from 10 to 500 mm and a tensile strength of from 5 to 100 MPa or, as desired, from 5 to 200 MPa at a temperature of 66° C.

Components of various structures and forms are known as isolation plugs, downhole tool members for well drilling and completion, and ball sealers for well drilling and completion. In addition, a ball sealer for well drilling and completion can be used alone as a blocking material or can be incorporated into an isolation plug or sleeve system together with a ball seat and used, and sealers of various sizes and structures are known.

4. Isolation Plug Provided with Downhole Tool Member for Well Drilling and Completion A preferable example of an isolation plug provided with the downhole tool member for well drilling and completion formed by machining the poly-L-lactic acid solid-state extrusion molded article of the present invention is an isolation plug provided with a downhole tool member for well drilling and completion formed from the poly-L-lactic acid solid-state extrusion molded article in which the downhole tool member for well drilling and completion is at least one type selected from the group consisting of:

a. a mandrel (core rod);
b. a pair of rings placed on an outer peripheral surface orthogonal to an axial direction of the mandrel (core rod); and
c. a slip and/or a wedge placed at a position between the pair of rings on the outer peripheral surface orthogonal to the axial direction of the mandrel (core rod).

In addition, a more preferable example is an isolation plug provided with a downhole tool member provided with at least one diameter expandable circular rubber member placed at a position between the pair of rings on the outer peripheral surface orthogonal to the axial direction of the mandrel.

The structure of an isolation plug provided with a downhole tool member for well drilling and completion will be described in detail with reference to the schematic diagram of FIG. 1. Specifically, the isolation plug illustrated in FIG. 1 comprises: a mandrel (core rod) 1; a pair of rings 2 and 2' placed on the outer peripheral surface orthogonal to the axial direction of the mandrel (core rod) 1; slips 3 and 3' placed at positions between the pair of rings 2 and 2' on the outer peripheral surface orthogonal to the axial direction of the mandrel (core rod) 1; wedges 4 and 4' placed so as to be in slidable contact with the slips 3 and 3' at positions between the pair of rings on the outer peripheral surface orthogonal to the axial direction of the mandrel (core rod) 1; and at least one diameter expandable circular rubber member 5 placed at a position between the pair of rings on the outer peripheral surface orthogonal to the axial direction of the mandrel. Furthermore, a ball sealer 10 and a roughly circular ball seat 12 having a circular gap in the center are provided in the hollow part h of the mandrel (core rod) 1.

In the isolation plug illustrated in the schematic diagram of FIG. 1, the pair of rings 2 and 2' are configured so that they can slide along the axial direction of the mandrel (core rod) 1 on the outer peripheral surface of the mandrel (core rod) 1 and so that the spacing therebetween can be changed. In addition, they are configured so that a force in the axial direction of the mandrel (core rod) 1 can be applied to the diameter expandable circular rubber member 5 and combinations of the slips 3 and 3' and the wedges 4 and 4' by coming into contact directly or indirectly with the end part along the axial direction of these components. The diameter expandable circular rubber member 5 expands in diameter in the direction orthogonal to the axial direction of the mandrel (core rod) 1 and comes into contact with the inside wall H of the downhole so as to close (seal) the space between the isolation plug and the downhole. The contact state with the inside wall H of the downhole can be maintained while boring or fracturing is subsequently performed, which yields the function of maintaining the seal between the isolation plug and the downhole. In addition, as a result of the slips 3 and 3' sliding over the sloping upper surfaces of the wedges 4 and 4' when a force in the axial direction of the mandrel (core rod) 1 is applied to the wedges 4 and 4', the slips 3 and 3' move outward in a direction orthogonal to the axial direction of the mandrel (core rod) 1 and come into contact with the inside wall H of the downhole so as to fix the plug and the inside wall H of the downhole. Furthermore, each ball sealer 10 provided in the hollow part h of the mandrel (core rod) 1 can move along the axial direction of the mandrel (core rod) 1 inside the hollow part h of the mandrel (core rod) 1, and the flow direction of a fluid can be adjusted as the ball sealer 10 comes into contact or moves away from the circular gap of the ball seat 12.

(Mandrel)

The mandrel (core rod) 1 provided in the isolation plug of the present invention is preferably a hollow mandrel in which the mandrel (core rod) 1 has a hollow part h along the axial direction from the perspectives of securing a flow path at the early stage of fracturing, the reduction of the weight of the mandrel (core rod) 1, and the control of the degradation rate of the mandrel (core rod) 1. The hollow part along the axial direction may be configured so as to penetrate the mandrel (core rod) 1 along the axial direction or to not penetrate the mandrel (core rod) 1 along the axial direction. When the mandrel (core rod) 1 has a hollow part h along the axial direction, the cross-sectional shape of the mandrel (core rod) 1 is a circular shape formed by two concentric circles forming the diameter (outside diameter) of the mandrel (core rod) 1 and the outside diameter of the hollow part h [corresponding to the inside diameter of the mandrel (core rod) 1]. The ratio of the diameters of the two concentric circles—that is, the ratio of the outside diameter of the hollow part h to the diameter of the mandrel (core rod) 1—is preferably at most 0.7. The magnitude of this ratio has a reciprocal relationship with the magnitude of the ratio of the thickness of the hollow mandrel to the diameter of the mandrel (core rod) 1, so determining the upper limit of this ratio can be considered equivalent to determining a preferable lower limit of the thickness of the hollow mandrel. When the thickness of the hollow mandrel is too thin, the strength (in particular, the tensile strength) of the hollow mandrel may be insufficient when the isolation plug is placed inside a well hole or at the time of well hole sealing or fracturing, which may damage the isolation plug in extreme cases. Therefore, the ratio of the outside diameter of the hollow part h to the diameter of the mandrel (core rod) 1 is more preferably at most 0.6 and even more preferably at most 0.5.

The diameter of the mandrel (core rod) 1 and/or the outside diameter of the hollow part may be uniform along the axial direction of the mandrel (core rod) 1 or may vary along the axial direction. That is, convex parts, stepped parts, concave parts (grooves), or the like may be formed on the outer peripheral surface of the mandrel (core rod) 1 when the outside diameter of the mandrel (core rod) 1 varies along the axial direction. In addition, convex parts, stepped parts, concave parts (grooves), or the like may be formed on the inner peripheral surface of the mandrel (core rod) 1 when the outside diameter of the hollow part varies along the axial direction. The convex parts, stepped parts, or concave parts (grooves) on the outer peripheral surface and/or the inner peripheral surface of the mandrel may be used as sites for attaching or fixing other members to the outer peripheral surface and/or the inner peripheral surface of the mandrel (core rod) 1 and, when the mandrel (core rod) 1 has a hollow part h, it may have a seat for holding the ball sealer 10 used to control the flow of a fluid.

The material for forming the mandrel (core rod) 1 is not particularly limited, but from perspectives such as the mechanical characteristics such as strength, the ease of machining, and, in particular, the ease of forming convex parts, stepped parts, concave parts (grooves), or the like on the outer peripheral surface or the inner peripheral surface of the mandrel (core rod) 1, it is preferable for the material to fall under the category of a downhole tool member for well drilling and completion formed by machining the poly-L-lactic acid solid-state extrusion molded article of the present invention.

(Fixing Part of the Circular Rubber Member)

The convex parts, stepped parts, concave parts (grooves), or the like on the outer peripheral surface of the mandrel (core rod) 1 can be used as fixing parts for fixing the diameter expandable circular rubber member 5. That is, as described in detail below, when the isolation plug of the present invention is provided with at least one diameter expandable circular rubber member 5 placed at a position between the pair of rings 2 and 2' on the outer peripheral surface orthogonal to the axial direction of the mandrel (core rod) 1, the diameter expandable circular rubber member 5 expands in diameter in the direction orthogonal to the axial direction as it is compressed in the axial direction of the mandrel (core rod) 1 so as to come into contact with the inside wall H of the well hole and to block (seal) the space between the plug and the well hole. Next, it is necessary for the seal between the plug and the well hole to be maintained while fracturing is performed, so the diameter expandable circular rubber member 5 must be held by some means in an expanded state—that is, in a compressed state in the axial direction of the mandrel (core rod) 1. The mandrel (core rod) 1 provided in the isolation plug of the present invention preferably has a fixing part for fixing the diameter expandable circular rubber member 5 to the outer peripheral surface in the compressed state. This fixing part may be a convex part, stepped part, or concave part (groove) as described above, or a screw part or another means capable of fixing the diameter expandable circular rubber member 5 to the outer peripheral surface of the mandrel (core rod) 1 in the compressed state can be used. From the perspective of the ease of processing or molding, strength, or the like, the fixing part is more preferably at least one type selected from the group consisting of a groove, stepped part, and a screw thread.

(Processed Portions on Outer Peripheral Surface)

The portions where the thickness, outside diameter, inside diameter, and the like of the mandrel (core rod) 1 vary such as the convex parts, stepped parts, concave parts (grooves), and screw parts on the outer peripheral surface and/or the inner peripheral surface of the mandrel (core rod) 1 (also called "processed portions" hereafter) are locations where stress is concentrated when the isolation plug is placed inside the well hole or at the time of well hole sealing or fracturing. Since the stress concentration is larger when the radius of curvature of the processed portions is smaller, the radius of curvature of the processed portions on the outer peripheral surface of the mandrel (core rod) 1 is preferably at least 0.5 mm and more preferably at least 1.0 mm in order to ensure that the strength (in particular, the tensile strength) of the mandrel (core rod) 1, in particular is sufficient.

(Metal Protection)

The mandrel (core rod) 1 provided in the isolation plug of the present invention may be configured so that part of the outer peripheral surface is protected by a metal as desired. That is, when the outer peripheral surface of the mandrel (core rod) 1 has a location protected by a metal so that the mandrel (core rod) 1 falls under the category of a downhole tool member for well drilling and completion formed by machining a poly-L-lactic acid solid-state extrusion molded article, for example, the degradability or strength of a desired location of the mandrel (core rod) 1 can be adjusted, and the bond strength with other members attached or fixed to the mandrel (core rod) 1 can be increased, which is preferable. The metal used to protect the outer peripheral surface is the material used to form the mandrel (core rod) 1 provided in the isolation plug or a metal or the like used for the reinforcement thereof and is not particularly limited, but specific examples include aluminum, iron, and nickel.

(Pair of Rings)

The pair of rings 2 and 2' provided in the isolation plug of the present invention are provided to apply a force in the axial direction of the mandrel (core rod) 1 to combinations of the slips 3 and 3' and the wedges 4 and 4' and the diameter expandable circular rubber member 5 placed on the outer peripheral surface orthogonal to the axial direction of the mandrel (core rod) 1. That is, the pair of rings 2 and 2' are configured so that they can slide along the axial direction of the mandrel (core rod) 1 on the outer peripheral surface of the mandrel (core rod) 1 and so that the spacing between the rings can be changed. In addition, they are configured so that a force in the axial direction of the mandrel (core rod) 1 can be applied to combinations of the slips 3 and 3' and the wedges 4 and 4', and the diameter expandable circular rubber member 5 by coming into contact directly or indirectly with the end part along the axial direction of these components.

The shape or size of each ring of the pair of rings 2 and 2' is not particularly limited as long as they fulfill the functions described above, but from the perspective of being able to effectively apply a force in the axial direction of the mandrel (core rod) 1 to combinations of the slips 3 and 3' and the wedges 4 and 4' and the diameter expandable circular rubber member 5, the end surface on the side making contact with these components of the rings preferably has a flat shape. Each ring of the pair of rings 2 and 2' is preferably a circular ring which completely surrounds the outer peripheral surface of the mandrel (core rod) 1, but it may also have breaks or deformed spots in the circumferential direction. In addition, as a shape in which the circle is separated in the circumferential direction, the circle may be formed as desired. A plurality of each of the rings of the pair of rings 2 and 2' may be placed adjacently in the axial direction so as to form a wide ring [with a large length in the axial direction of the mandrel (core rod) 1]. These may be considered rings for forming the pair of rings 2 and 2' in the isolation plug of the present invention, including members which contribute to effectively applying a force in the axial direction of the mandrel (core rod) 1 to the combinations of the slips 3 and 3' and the wedges 4 and 4' and the diameter expandable circular rubber member 5.

The material for forming the pair of rings 2 and 2' is not particularly limited, but at least one of the rings 2 and 2' may correspond to a downhole tool member for well drilling and completion formed by machining the poly-L-lactic acid solid-state extrusion molded article of the present invention. When both of the rings of the pair of rings 2 and 2' correspond to downhole tool members for well drilling and completion formed by machining a poly-L-lactic acid solid-state extrusion molded article, the types or compositions of the resins of the resin materials forming the poly-L-lactic acid solid-state extrusion molded article may be the same or different. When one of the pair of rings 2 and 2' corresponds to a downhole tool member for well drilling and completion formed by machining a poly-L-lactic acid solid-state extrusion molded article, a metal such as aluminum or iron or a composite material of a reinforcing resin or the like can be used as the material for forming the other ring.

The pair of rings 2 and 2' may have the same or similar shapes or structures, or the shapes or structures may be different. For example, each ring of the pair of rings 2 and 2' may differ in outside diameter or length in the axial direction of the mandrel (core rod) 1. In addition, one of the rings of the pair of rings 2 and 2' may be configured in a state in which it cannot slide with respect to the mandrel (core rod) 1 as desired, for example. In this case, the other ring of the pair of rings 2 and 2' slides over the outer peripheral surface of the mandrel (core rod) 1 and comes into contact with the end part along the axial direction of combinations of the slips 3 and 3' and the wedges 4 and 4' and the diameter expandable circular rubber member 5. The configuration in which one of the rings of the pair of rings 2 and 2' cannot slide with respect to the mandrel (core rod) 1 as desired is not particularly limited, but, for example, the mandrel (core rod) 1 and one of the pair of rings 2 and 2' may be formed integrally (in this case, the ring in question can never slide with respect to the mandrel (core rod) 1), or a clutch structure such as a dog clutch or a fitting structure may be used (in this case, it is possible to switch between a state in which the ring can slide with respect to the mandrel (core rod) 1 and a state in which the ring cannot slide with respect to the mandrel (core rod) 1). As an isolation plug in which the mandrel (core rod) 1 and one of the rings of the pair of rings 2 and 2' are formed integrally, an isolation plug in which these components are formed by integral molding or an isolation plug in which the mandrel (core rod) 1 and one of the rings of the pair of rings 2 and 2' are formed by machining the poly-L-lactic acid solid-state extrusion molded article of the present invention is provided.

Furthermore, the isolation plug of the present invention may be provided with a plurality of pairs of rings 2 and 2'. In this case, at least one of each of the combinations of the slips 3 and 3' and the wedges 4 and 4' and the diameter expandable circular rubber member 5 may be placed, individually or in combination, at positions between the plurality of pairs of rings.

(Slips and Wedges)

The isolation plug of the present invention may be provided with at least one combination of slips 3 and 3' and wedges 4 and 4' placed at positions between the pair of rings 2 and 2' on the outer peripheral surface orthogonal to the axial direction of the mandrel (core rod) 1 (in FIG. 1, a plurality of combinations of slips and wedges are provided as a combination of the slip 3 and the wedge 4 and a combination of the slip 3' and the wedge 4'). The combinations of the slips 3 and 3' and the wedges 4 and 4' are themselves well known as means for fixing the plug and the well hole in the isolation plug. That is, conventionally, slips 3 and 3' formed from a metal, inorganic product, or the like are often placed in slidable contact with the sloping upper surfaces of the wedges 4 and 4' formed from a composite material or the like, and when a force in the axial direction of the mandrel (core rod) 1 is applied to the wedges 4 and 4' by the method described above, the slips 3 and 3' move outward in a direction orthogonal to the axial direction of the mandrel (core rod) 1 so as to make contact with the inside wall H of the well hole and to fix the plug and the inside wall H of the well hole. The slips 3 and 3' may be provided with one or more grooves, convex parts, rough surfaces (corrugation), or the like at the parts making contact with the inside wall H of the well hole in order to make the blocking (sealing) of the space between the plug and the well hole even more reliable. In addition, the slips 3 and 3' may be divided into a prescribed number in the circumferential direction orthogonal to the axial direction of the mandrel (core rod) 1 or, as illustrated in FIG. 1, may have notches beginning at one end along the axial direction and ending at an intermediate point in the direction of the other end (in this case, a force in the axial direction of the mandrel (core rod) 1 is applied to the wedges 4 and 4', and the wedges 4 and 4' penetrate into the lower surfaces of the slips 3 and 3' so that the slips 3 and 3' are divided along the notches and the extended lines thereof, and each divided piece then moves outward in a direction orthogonal to the axial direction of the mandrel (core rod) 1).

In the isolation plug of the present invention, the combinations of the slips 3 and 3' and the wedges 4 and 4' are placed at positions between the pair of rings 2 and 2' and may be placed adjacent to the diameter expandable circular rubber member 5 so that a force in the axial direction of the mandrel (core rod) 1 can be applied. As illustrated in FIG. 1, when the isolation plug of the present invention is provided with a plurality of combinations of slips 3 and 3' and wedges 4 and 4', they may be placed adjacently so as to sandwich the diameter expandable circular rubber member 5, or they may be placed at other positions. When the isolation plug of the present invention is provided with a plurality of diameter expandable circular rubber members 5, the arrangement of the combinations of slips 3 and 3' and wedges 4 and 4' can be selected appropriately as desired.

In addition, the isolation plug of the present invention may be configured so as to not be provided with combinations of slips 3 and 3' and wedges 4 and 4'. When the isolation plug of the present invention is not provided with slips 3 and 3' and wedges 4 and 4', the diameter expandable circular rubber member 5 comes into contact with the pair of rings 2 and 2' and expands when a force in the axial direction of the mandrel (core rod) 1 is applied.

When the isolation plug of the present invention is provided with combinations of slips 3 and 3' and wedges 4 and 4', one or both of the slips 3 and 3' or the wedges 4 and 4' may correspond to a downhole tool member for well drilling and completion formed by machining a poly-L-lactic acid solid-state extrusion molded article. In addition, one or both of the slips 3 and 3' or the wedges 4 and 4' may be a poly-L-lactic acid composition in which the resin material contains from 5 to 70 mass % of a filler based on the total amount.

(Diameter Expandable Circular Rubber Member)

The isolation plug of the present invention may be provided with at least one diameter expandable circular rubber member 5 placed at a position between the pair of rings 2 and 2' on the outer peripheral surface orthogonal to the axial direction of the mandrel (core rod) 1. When the diameter expandable circular rubber member 5 comes into contact directly or indirectly with the pair of rings 2 and 2', the force in the axial direction of the mandrel (core rod) 1 is transmitted over the outer peripheral surface of the mandrel (core rod) 1. As a result, the diameter expandable circular rubber member 5 expands in a direction orthogonal to the axial direction of the mandrel (core rod) 1 as it is compressed in the axial direction of the mandrel (core rod) 1 so as to come into contact with the inside wall H of the well hole and to block (seal) the space between the plug and the well hole. The diameter expandable circular rubber member 5 can maintain a state of contact with the inside wall H of the well hole while fracturing is subsequently performed, which yields the function of maintaining the seal between the plug and the well hole.

The diameter expandable circular rubber member 5 is not limited with regard to its material, shape, or structure as long as it has the function described above. For example, by using a circular rubber member 5 having a shape in which the cross section in the circumferential direction orthogonal to the axial direction of the mandrel (core rod) 1 has an inverted U-shape, it is possible to expand in diameter toward the vertex part of the inverted U-shape as the tip portion of the U-shape is compressed in the axial direction of the mandrel (core rod) 1.

The diameter expandable circular rubber member 5 comes into contact with the inside wall H of the well hole when expanded in diameter so as to block (seal) the space between the plug and the well hole, and a gap is present between the plug and the well hole when the diameter expandable circular rubber member 5 is not expanded. Therefore, the length of the diameter expandable circular rubber member 5 in the axial direction of the mandrel (core rod) 1 is preferably from 10 to 70% and more preferably from 15 to 65% with respect to the length of the mandrel (core rod) 1. As a result, the isolation plug of the present invention has a sufficient sealing function, which yields a function of assisting to fix the well hole and the plug after sealing.

The isolation plug of the present invention may be provided with a plurality of diameter expandable circular rubber members 5. In this case, the space between the plug and the well hole can be blocked (sealed) at a plurality of positions, and the function of assisting to fix the well hole and the plug can be achieved even more reliably. When the isolation plug of the present invention is provided with a plurality of diameter expandable circular rubber members 5, the length of the diameter expandable circular rubber members 5 in the axial direction of the mandrel (core rod) 1 described above refers to the total of the lengths of the plurality of diameter expandable circular rubber members 5 in the axial direction of the mandrel (core rod) 1. When the isolation plug of the present invention is provided with a plurality of diameter expandable circular rubber members 5, the diameter expandable circular rubber members 5 may have the same materials, shapes, or structures, or they may be different. In addition, a plurality of diameter expandable circular rubber members 5 may be placed adjacently or at a distance from one another at positions between the pair of rings 2 and 2' or may be placed at positions between each pair of a plurality of pairs of rings 2 and 2'.

The diameter expandable circular rubber member 5 may be a rubber member with a structure formed from a plurality of rubber members such as a laminated rubber. In addition, the diameter expandable circular rubber member 5 may be provided with one or more grooves, convex parts, rough surfaces (corrugation), or the like at the parts making contact with the inside wall H of the well hole in order to further ensure the blocking (sealing) of the space between the plug and the well hole and the assistance of the fixing of the well hole and the plug at the time of diameter expansion.

The diameter expandable circular rubber member 5 must not exhibit any loss of sealing function even as a result of contact with even higher pressures or fracturing fluids associated with fracturing in high-temperature and high-pressure environments deep underground. Therefore, a rubber material having excellent heat resistance, oil resistance, and water resistance is preferable. For example, nitrile rubbers, hydrogenated nitrile rubbers, acrylic rubbers, and the like can be used. Furthermore, the diameter expandable circular rubber member 5 may also be formed from a degradable material. As a rubber serving as a degradable material, it is possible to use a conventionally known material as a biodegradable rubber, a hydrolyzable rubber, or degradable rubber that can be chemically degraded by some other method. Preferable examples include rubber materials such as aliphatic polyester rubbers, natural rubbers, polyisoprene, ethylene propylene rubbers, butyl rubbers, styrene rubbers (styrene-butadiene rubber or the like), acrylic rubbers, chloroprene rubbers, and urethane rubbers. In addition, from the perspective degradability and disintegrability, rubber materials having hydrolyzable functional groups (for example, urethane groups, ester groups, amide groups, carboxyl groups, hydroxyl groups, silyl groups, acid anhydrides, acid halides, and the like) may also be preferably used. A particularly preferable rubber material is a urethane rubber since it is possible to easily control the degradability or disintegrability thereof by adjusting the structure, hardness, or degree of crosslinking of the rubber material or selecting other compounding agents. In addition, nitrile rubbers or hydrogenated nitrile rubbers, which are rubber materials that are conventionally used widely for downhole tools due to their excellent oil resistance, heat resistance, water resistance, and the like, often do not fall under the category of degradable materials.

An isolation plug provided with a downhole tool member for well drilling and completion formed by machining the poly-L-lactic acid solid-state extrusion molded article of the present invention can be used as at least one type selected from the group consisting of a mandrel (core rod) 1, a pair of rings 2 and 2', slips 3 and 3', and wedges 4 and 4'. However, particularly preferably, the downhole tool member for well drilling and completion formed from the poly-L-lactic acid solid-state extrusion molded article is used for the mandrel (core rod) 1 of the isolation plug.

5. Other Secondary Molded Articles

The poly-L-lactic acid solid-state extrusion molded article of the present invention serving as a stock shape for machining can be molded into other secondary molded articles by means of machining. In electric and electronic fields, examples thereof include wafer carriers, wafer cassettes, spin chucks, tote bottles, wafer boards, IC chip trays, IC chip carriers, IC conveying tubes, IC test sockets, burn-in sockets, pin grid array sockets, quad flat packages, leadless chip carriers, dual in-line packages, small outline packages, reel packings, various cases, storage trays, parts for conveying apparatus, magnetic card readers, and the like.

In a field of OA instruments, examples thereof include various roll components in image forming apparatus such as electrophotographic copying machines and electrostatic recording apparatus, transfer drums for recording apparatus, printed circuit board cassettes, bushings, paper and paper money conveying parts, paper feed rails, font cartridges, ink ribbon canisters, guide pins, trays, rollers, gears, sprockets, housings for computers, modem housings, monitor housings, CD-ROM housings, printer housings, connectors, computer slots, and the like.

In a field of communication apparatus, examples thereof include portable telephone parts, pagers, various kinds of sliding materials, and the like. In a field of automobiles, examples thereof include interior materials, underhoods, electronic and electric instrument housings, gas tank caps, fuel filters, fuel line connectors, fuel line clips, fuel tanks, instrument bezels, door handles, other various parts, and the like. In other fields, examples thereof include electric wire supporters, electromagnetic wave absorbers, flooring materials, pallet, shoe soles, brushes, blower fans, flat heaters, polyswitches, and the like.

6. Well Drilling and Completion Method

The present invention provides a well drilling and completion method in which a ball sealer for well drilling and completion with a diameter of from 20 to 200 mm formed by machining the poly-L-lactic acid solid-state extrusion molded article of the present invention is used to perform blocking treatment on a well hole, and part or all of the ball sealer for well drilling and completion is then degraded; and a well drilling and completion method in which an isolation plug provided with a downhole tool member for well drilling and completion formed by machining the poly-L-lactic acid solid-state extrusion molded article of the present invention is used to perform blocking treatment on a well hole, and part or all of the downhole tool member for well drilling and completion is then degraded. With these well drilling and completion methods, when fracturing in each prescribed area is completed, or when well drilling and completion is finished and the well is completed so that the production of petroleum, natural gas, or the like is begun, part or all of the ball sealer is degraded by biodegradation, hydrolysis, or chemical degradation by some other method, which makes it possible to easily remove the ball sealer. In addition, part or all of the downhole tool members for well drilling and completion such as the mandrel, the pair of rings, slips, or wedges provided in the isolation plug and, as necessary, the diameter expandable circular rubber member serving as a downhole tool member for well drilling and completion are degraded, which makes it possible to easily remove a downhole tool member for well drilling and completion and an isolation plug provided with the downhole tool member for well drilling and completion. As a result, with the well drilling and completion method of the present invention, the substantial cost and time conventionally required to remove, recover, or destroy or fragmentize, by pulverization, perforation, or another method, many isolation plugs or ball sealers remaining inside a well after the completion of the well become unnecessary, which makes it possible to reduce the cost or steps of well drilling and completion.

EXAMPLES

The present invention will be more specifically described hereinafter with reference to working examples and comparative examples. The present invention is not limited to examples. The measurement methods for the physical properties and characteristics are as follows.

(1) Weight Average Molecular Weight of Poly-L-Lactic Acid

The weight average molecular weight of the poly-L-lactic acid was measured by the following method. Specifically, after 10 mg of a sample (a resin material sampled from a poly-L-lactic acid supplied to an extruder or a poly-L-lactic acid solid-state extrusion molded article) was dissolved in hexafluoroisopropanol (HFIP) in which sodium trifluoroacetate was dissolved at a concentration of 5 mM so as to form 10 mL, the sample was filtered with a membrane filter to obtain a sample solution. By injecting 10 μL of the sample solution into a gel permeation chromatography (GPC) instrument, the molecular weight of the sample solution was measured under the following conditions. Note that the sample solution was injected into the GPC instrument within 30 minutes after the sample solution was dissolved.

<GPC Measurement Conditions>
Instrument: LC-9A, manufactured by Shimadzu Corporation
Column: two HFIP-806M (connected in series), manufactured by Showa Denko K.K.
Pre-column: one HFIP-LG
Column Temperature: 40° C.
Eluent: HFIP solution in which sodium trifluoroacetate is dissolved at a concentration of 5 mM
Flow rate: 1 mL/min
Detector: differential refractometer
Molecular weight calibration: data of a molecular weight calibration curve produced by using five types of polymethylmethacrylates having standard molecular weights that are different from each other (manufactured by Polymer Laboratories Ltd.) is used (2) Melt Viscosity After an amorphous sheet of poly-L-lactic acid with a thickness of approximately 0.2 mm was produced from a small fragment sampled from a poly-L-lactic acid supplied to an extruder or a poly-L-lactic acid solid-state extrusion molded article, the sheet was heated for 5 minutes at approximately 150° C. and crystallized. Using this sample, the melt viscosity of the sample at a temperature of 240° C. and a shear rate of 120 sec$^{-1}$ was measured using a capillograph equipped with a nozzle of D=0.5 mm and L=5 mm [Capillo 1A produced by Toyo Seiki Seisaku-Sho, Ltd.].

(3) Tensile Strength at a Temperature of 66° C.

The measurement of the tensile strength of the poly-L-lactic acid solid-state extrusion molded article at a temperature of 66° C. was performed in accordance with JIS K7113 by using a 2t Autograph AG-2000E produced by the Shimadzu Corporation, placing a test sample inside an oven at a temperature of 66° C., and measuring the maximum stress with respect to tension in the lengthwise direction (units: MPa).

(4) Practical Use Test

A hollow body produced by machining the poly-L-lactic acid solid-state extrusion molded article was incorporated into an isolation plug as an isolation plug mandrel (core rod), and a tensile test was performed at 3,500 kgf (34,300 N) in a heating oven at a temperature of 66° C. to confirm the presence or absence of the breakage of the mandrel (core rod).

Working Example 1

Pellets of a poly-L-lactic acid having a weight average molecular weight of 290,000, a melt viscosity of 560 Pa·s as measured at a temperature of 240° C. and a shear rate of 120 sec$^{-1}$, and an L-form ratio of 95% were held for 6 hours at a temperature of 80° C. and dehumidified drying. The dehumidified drying pellets were supplied to the hopper of a single-screw extruder (L/D=20; diameter: 30 mm 4), melt-kneaded at a cylinder temperature of 215° C., melt-extruded into a flow path of a forming die at an extrusion die outlet temperature of 225° C., and cooled and solidified at a cooling temperature of 50° C. The extrusion rate was approximately 20 mm/10 minutes.

By passing the solid-state extrusion molded article that was solidified in the flow path of the forming die between an upper roll group and a lower roll group to subject to pressurization thereof, the external pressure (back pressure) of the forming die was adjusted to 3,000 kg, and the poly-L-lactic acid solid-state extrusion molded article was thereby densified. Thereafter, the solid-state extrusion molded article was heat-treated at a temperature of 120° C. for 8 hours to remove residual stress. With this method, a round bar-shaped poly-L-lactic acid solid-state extrusion molded article with a diameter of 80 mm and a length of 1,000 mm was obtained. The weight average molecular weight of the poly-L-lactic acid in this solid-state extrusion molded article was 240,000, and the melt viscosity of the resin material was 230 Pa·s. A test piece was cut out from this round bar, and when the maximum point stress with respect to tension in the lengthwise direction at a temperature of 66° C. was measured, the result was 25 MPa (tensile strength at 66° C.).

Working Example 2

A round bar-shaped poly-L-lactic acid solid-state extrusion molded article with a diameter of 80 mm and a length of 1,000 mm was obtained in the same manner as in Working Example 1 with the exception that a sample prepared by melt-kneading the poly-L-lactic acid used in Working Example 1 and glass fibers (O3JAFT592 produced by Owens Corning; diameter: 10 μm, length: 3 mm) at a mass ratio of 70:30 and holding the pelletized resin material for 6 hours at a temperature of 80° C. to dehumidify drying the sample was used as a raw material. The weight average molecular weight of the poly-L-lactic acid in this solid-state extrusion molded article was 220,000, and the melt viscosity of the resin material was 440 Pa·s. A test piece was cut out from this round bar, and when the tensile strength at 66° C. was measured, the result was 32 MPa.

Working Example 3

The poly-L-lactic acid used in Working Example 1 was melt-extruded while drawing long glass fibers with a diameter of 10 μm, and the glass fibers were covered. A strand in which the poly-L-lactic acid and the glass fibers had a mass ratio of 70:30 was cut to a length of 3 mm so as to prepare pellets of a resin material containing a poly-L-lactic acid. The glass fibers contained in the pellets had a diameter of 10 μm and a length (weight average) of 2.95 mm (aspect ratio: 295). A round bar-shaped poly-L-lactic acid solid-state extrusion molded article with a diameter of 80 mm and a length of 1,000 mm was obtained in the same manner as in Working Example 1 with the exception that a sample prepared by holding the pelletized resin material for 6 hours at a temperature of 80° C. to dehumidify drying the sample was used as a raw material. The weight average molecular weight of the poly-L-lactic acid in this solid-state extrusion molded article was 220,000, and the melt viscosity of the resin material was 640 Pa·s. A test piece was cut out from this round bar, and when the tensile strength at 66° C. was measured, the result was 75 MPa.

Machining was performed at 495 rpm using a single-blade high-speed steel byte from the round bars obtained in Working Examples 1 to 3, and 11 balls for ball sealers for well drilling and completion with a diameter of 76.2 mm (3 inches) were produced.

In addition, a hollow mandrel (core rod) for a frac plug was produced from the resulting round bar using gouging and a high-speed steel byte. The produced mandrel (core rod) was incorporated into an isolation plug, and when a tensile test was performed at 3,500 kgf (34,300 N) in an environment at a temperature of 66° C., no breaking occurred in the mandrel (core rod), and a blocking mechanism was realized.

Comparative Example 1

A round bar-shaped poly-L-lactic acid solid-state extrusion molded article with a diameter of 80 mm and a length of 1,000 mm was obtained in the same manner as in Working Example 1 with the exception that a sample prepared by drying poly-L-lactic acid pellets having a weight average molecular weight of 260,000, a melt viscosity of 380 Pas as measured at a temperature of 240° C. and a shear rate of 120 sec$^{-1}$, and an L-form ratio of 75% for 24 hours at a temperature of 50° C. was used as a raw material. The weight average molecular weight of the poly-L-lactic acid in this solid-state extrusion molded article was 200,000, and the melt viscosity of the resin material was 180 Pa·s. A test piece was cut out from this round bar, and when the tensile strength at 66° C. was measured, the result was 0.4 MPa.

It can be seen from Working Examples 1 to 3 that a poly-L-lactic acid solid-state extrusion molded article comprising a resin material containing a poly-L-lactic acid having a weight average molecular weight of from 100,000 to 380,000 and a melt viscosity of from 20 to 2,000 Pa·s as measured at a temperature of 240° C. and a shear rate of 120 sec$^{-1}$ and having an L-form content of from 80 to 100%, the article having a thickness or diameter of from 10 to 500 mm and a tensile strength of from 5 to 100 MPa or, if desired, from 5 to 200 MPa at a temperature of 66° C., has excellent machinability and can be molded into a secondary product by machining such as cutting, drilling, or shearing—in particular, a ball sealer for well drilling and completion, a downhole tool for well drilling and completion, or a member thereof.

In contrast, it can be seen that the poly-L-lactic acid solid-state extrusion molded article of Comparative Example 1 comprising a resin material containing a poly-L-lactic acid having a weight average molecular weight of 200,000 and a melt viscosity of 380 Pa·s as measured at a temperature of 240° C. and a shear rate of 120 sec$^{-1}$ but having an L-form content of 75%, has a tensile strength of 0.4 MPa at a temperature of 66° C., so the strength in high-temperature environments required in applications such as downhole tool members for well drilling and completion, for example, is insufficient, and it was inferred that there is also a risk that problems such as the development of cracks may occur due to machining such as cutting or shearing.

INDUSTRIAL APPLICABILITY

The poly-L-lactic acid solid-state extrusion molded article of the present invention is a poly-L-lactic acid solid-state extrusion molded article comprising a resin material containing a poly-L-lactic acid having a weight average molecular weight of from 100,000 to 380,000 and a melt viscosity of from 20 to 2,000 Pa·s as measured at a temperature of 240° C. and a shear rate of 120 sec$^{-1}$ and having an L-form content of from 80 to 100%, the article having a thickness or diameter of from 10 to 500 mm and a tensile strength of from 5 to 100 MPa or, if desired, from 5 to 200 MPa at a temperature of 66° C. It is therefore possible to provide a solid-state extrusion molded article of a degradable plastic which can be molded into a secondary molded article of a desired shape by machining such as cutting, drilling, or shearing—in particular, a downhole tool member or the like for well drilling and completion provided on an isolation plug—has sufficient strength in environments exceeding 1,000 m underground (environments at temperatures exceeding 65° C. or the like), and can form a downhole tool member or the like of a desired shape, which has high industrial applicability.

In addition, with the well drilling and completion method of the present invention, a well drilling and completion method is provided in which it is possible to easily remove a ball sealer, a downhole tool for well drilling and completion, or members thereof after blocking treatment is performed on a well hole, and the cost or steps of well drilling and completion are reduced, which has high industrial applicability.

EXPLANATION OF SYMBOLS

1: Mandrel
2, 2': (Pair of) rings
3, 3': Slips
4, 4': Wedges
5: Diameter expandable circular rubber member
10: Ball sealer
12: Ball seat
H: Inside wall of downhole
h: Hollow part of mandrel

The invention claimed is:

1. A ball sealer for well drilling with a diameter of from 20 to 200 mm formed by machining a solid-state extrusion molded article of poly-L-lactic acid comprising a resin material containing a poly-L-lactic acid having a weight average molecular weight of from 100,000 to 380,000 and a melt viscosity of from 20 to 2,000 Pa·s as measured at a temperature of 240° C. and a shear rate of 120 sec$^{-1}$ and having an L-form ratio of from 80 to 100%, the article having a thickness or diameter of from 10 to 500 mm and a tensile strength of from 5 to 200 MPa at a temperature of 66° C.

2. A downhole tool member for well drilling formed by machining a solid-state extrusion molded article of poly-L-lactic acid comprising a resin material containing a poly-L-lactic acid having a weight average molecular weight of from 100,000 to 380,000 and a melt viscosity of from 20 to 2,000 Pa·s as measured at a temperature of 240° C. and a shear rate of 120 sec$^{-1}$ and having an L-form ratio of from 80 to 100%, the article having a thickness or diameter of from 10 to 500 mm and a tensile strength of from 5 to 200 MPa at a temperature of 66° C.

3. An isolation plug comprising the downhole tool member for well drilling described in claim 2.

4. The isolation plug according to claim 3, wherein the downhole tool member for well drilling is at least one selected from the group consisting of:

a. a mandrel;
b. a pair of rings placed on an outer peripheral surface orthogonal to an axial direction of the mandrel; and
c. at least one of or both a slip and a wedge placed at a position between the pair of rings on the outer peripheral surface orthogonal to the axial direction of the mandrel.

5. The isolation plug according to claim 4, wherein the mandrel has a hollow part along the axial direction.

6. The isolation plug according to claim 5, wherein a ratio of the outside diameter of the hollow part of the mandrel to the diameter of the mandrel is at most 0.7.

7. The isolation plug according to claim 4, wherein the mandrel and one of the rings of the pair of rings are formed integrally.

8. The isolation plug according to claim 4, wherein the outer peripheral surface of the mandrel is partially protected by a metal.

9. The isolation plug according to claim 4 comprising at least one combination of a slip and a wedge that are placed at a position between the pair of rings on the outer peripheral surface orthogonal to the axial direction of the mandrel.

10. The isolation plug according to claim 9 comprising a plurality of combinations of slips and wedges.

11. The isolation plug according to claim 4, said isolation plug comprising at least one expandable circular rubber member placed at a position between the pair of rings on the outer peripheral surface orthogonal to the axial direction of the mandrel.

12. The isolation plug according to claim 11, wherein a length of the expandable circular rubber member in the axial direction of the mandrel is from 10 to 70% with respect to a length of the mandrel.

13. The isolation plug according to claim 11, wherein the mandrel has a fixing part for fixing the expandable circular rubber member to the outer peripheral surface in a compressed state.

14. The isolation plug according to claim 11 comprising a plurality of the expandable circular rubber members.

15. A method for producing a solid-state extrusion molded article of poly-L-lactic acid having a thickness or diameter from 10 to 500 mm and a tensile strength from 5 to 200 MPa at a temperature of 66° C., the method comprising steps 1 to 4:

1) a step 1 of supplying a resin material containing poly-L-lactic acid having a weight average molecular weight from 150,000 to 540,000 and a melt viscosity from 30 to 3,000 Pa·s as measured at a temperature of 240° C. and a shear rate of 120 sec$^{-1}$ and having an L-form ratio from 80 to 100% to an extruder and melt-kneading the resin material at an extruder cylinder temperature from 195 to 260° C.;

2) a step 2 of extruding the resin material melted by melt-kneading from an extrusion die at a tip of the extruder into a flow path of a forming die comprising a cooling means and a flow path that communicates with a path of the melted resin of the extrusion die and that has a cross-sectional shape of an extrusion-molded article;

3) a step 3 of cooling the melted and extruded product formed of the resin material in the flow path of the forming die to be solidified and then extruding the solid-state extrusion molded product from the tip of the forming die to the outside; and 4) a step 4 of pressurizing and drawing the solid-state extrusion molded product while applying back pressure to the product in a direction of the forming die to suppress expansion of the solid-state extrusion molded product in a thickness direction or radial direction due to pressure so as to obtain a solid-state extrusion molded article having a thickness or diameter from 10 to 500 mm.

16. The production method according to claim 15 further comprising a step 5 of heat-treating the solid-state extrusion molded article of poly-L-lactic acid obtained in step 4 for 3 to 24 hours at a temperature from 90 to 190° C.

17. A method of drilling a well wherein the ball sealer for well drilling described in claim 1 is used to perform blocking treatment on a well hole, and part or all of the ball sealer for well drilling is then degraded.

18. A method of drilling a well wherein an isolation plug comprising a downhole tool member for well drilling described in claim 3 is used to perform blocking treatment, and part or all of the downhole tool member for well drilling is then degraded.

* * * * *